US006996781B1

(12) United States Patent
Myers et al.

(10) Patent No.: US 6,996,781 B1
(45) Date of Patent: Feb. 7, 2006

(54) SYSTEM AND METHOD FOR GENERATING XSL TRANSFORMATION DOCUMENTS

(75) Inventors: Kenneth L. Myers, Katy, TX (US); Maulik A. Modi, Houston, TX (US)

(73) Assignee: QCORPS Residential, Inc., Houston, TX (US)

( * ) Notice: Subject to any disclaimer, the term of this patent is extended or adjusted under 35 U.S.C. 154(b) by 782 days.

(21) Appl. No.: 09/999,822

(22) Filed: Oct. 31, 2001

(51) Int. Cl.
*G06F 3/00* (2006.01)
*G06F 17/00* (2006.01)

(52) U.S. Cl. .................. 715/763; 715/760; 715/854; 715/513; 715/523

(58) Field of Classification Search ............... 715/763, 715/762, 760, 700, 764, 780–781, 803–804, 715/808, 853–855, 961, 967, 523, 501.1, 715/513, 517, 530
See application file for complete search history.

(56) References Cited

U.S. PATENT DOCUMENTS

| | | | |
|---|---|---|---|
| 6,714,219 B2 * | 3/2004 | Lindhorst et al. ........... | 715/769 |
| 6,795,830 B1 * | 9/2004 | Banerjee et al. ............ | 707/200 |
| 2002/0035584 A1 * | 3/2002 | Scheier et al. .............. | 707/517 |
| 2002/0078103 A1 * | 6/2002 | Gorman et al. ............. | 707/530 |
| 2002/0122060 A1 * | 9/2002 | Markel ....................... | 345/760 |
| 2003/0037303 A1 * | 2/2003 | Bodlaender et al. ........ | 715/523 |
| 2003/0074481 A1 * | 4/2003 | Fox et al. ................... | 709/310 |
| 2003/0177449 A1 * | 9/2003 | Rose .......................... | 715/530 |
| 2003/0237046 A1 * | 12/2003 | Parker et al. ................ | 715/513 |
| 2004/0015782 A1 * | 1/2004 | Day et al. ................... | 715/517 |
| 2004/0019853 A1 * | 1/2004 | Takizawa et al. ........... | 715/523 |
| 2004/0044965 A1 * | 3/2004 | Toyama et al. ............. | 715/523 |
| 2004/0093417 A1 * | 5/2004 | Perry ......................... | 709/227 |
| 2004/0130572 A1 * | 7/2004 | Bala ........................... | 345/762 |
| 2004/0148588 A1 * | 7/2004 | Sadiq ......................... | 717/109 |
| 2004/0177335 A1 * | 9/2004 | Beisiegel et al. ........... | 717/102 |
| 2004/0181752 A1 * | 9/2004 | Kinno et al. ................ | 715/513 |
| 2004/0205562 A1 * | 10/2004 | Rozek et al. ............... | 715/513 |
| 2004/0205578 A1 * | 10/2004 | Wolff et al. ................. | 715/513 |

* cited by examiner

*Primary Examiner*—Sy D. Luu
(74) *Attorney, Agent, or Firm*—Conley Rose, P.C.

(57) ABSTRACT

A system and method is disclosed for generating XSL transformation documents. A software wizard presents a series of screens to lead the user through the authoring process. The screens include a load screen, a select screen, a new entity screen, a conditional screen, and a view screen. The load screen prompts the user for an input document name. The wizard then retrieves XML entities from the input document and presents them to the user in tree form on the select screen. The user selects entities from the tree for inclusion in the output document. The new entity screen allows the user to create new entities for inclusion in the output document. These entities are accumulated in an output list. The conditional screen allows the user to make entities from the output list conditional. The view screen allows review of a tentative transformation document that will accomplish the user's purpose.

2 Claims, 16 Drawing Sheets

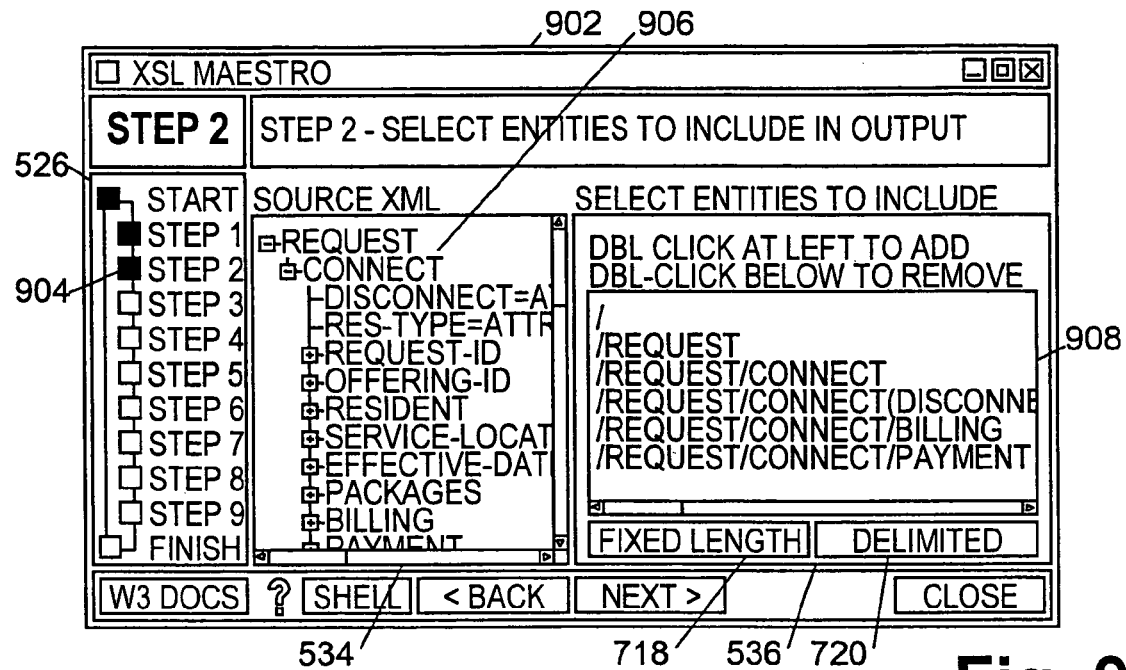
Fig. 9
Fig. 10
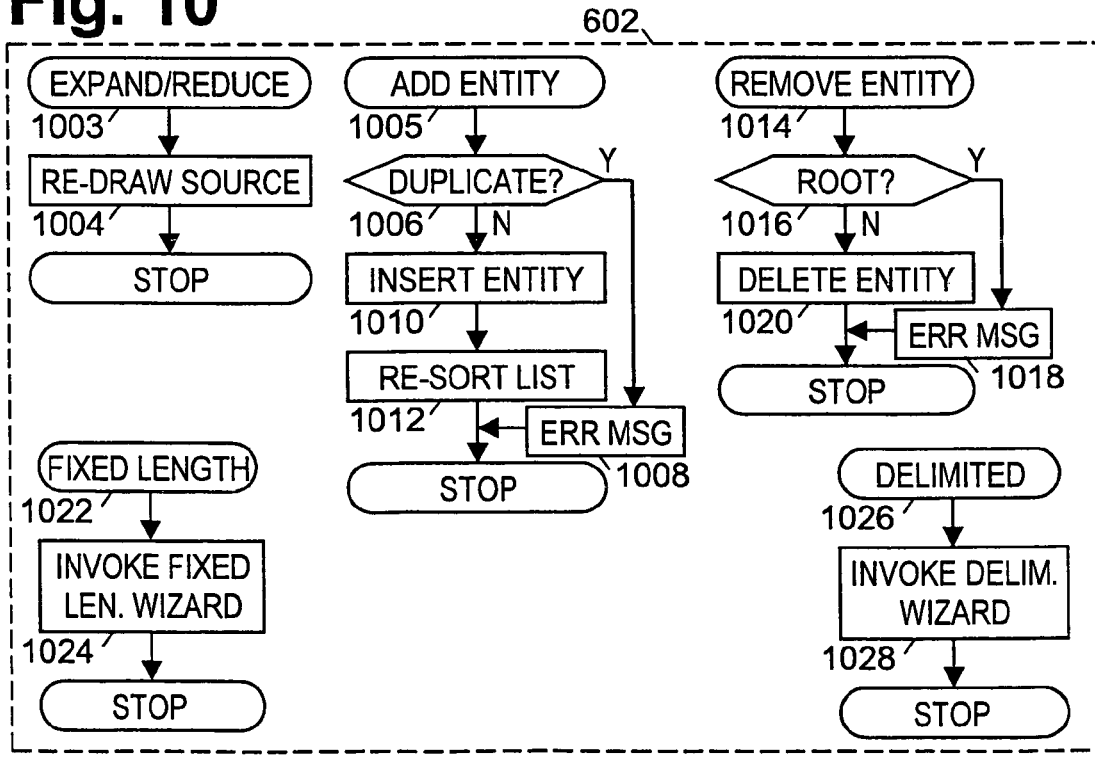

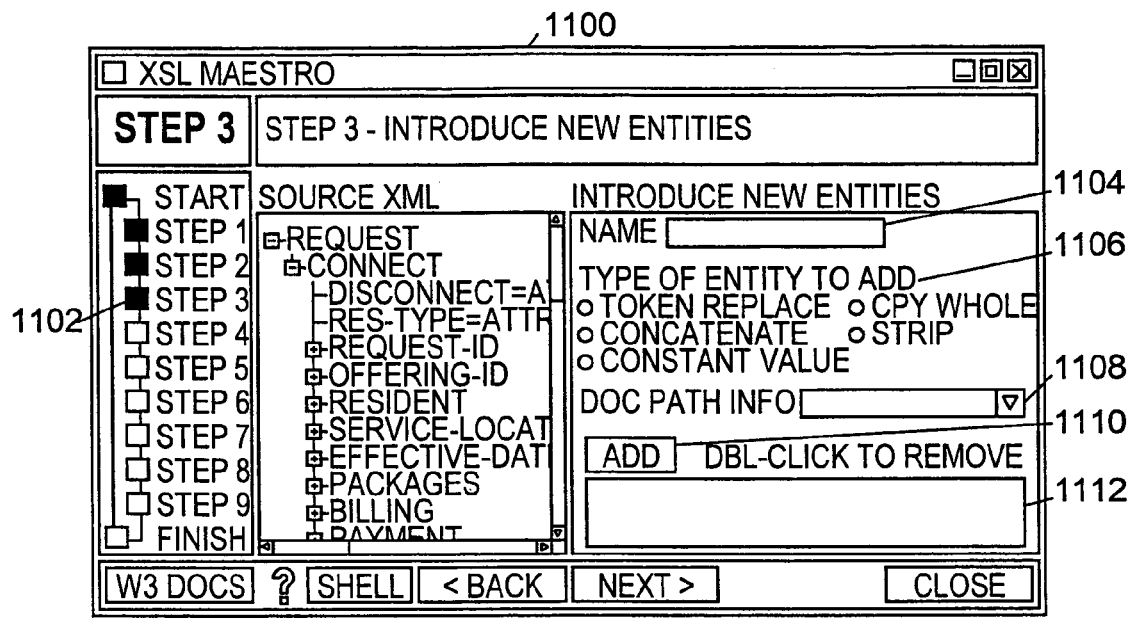
Fig. 11
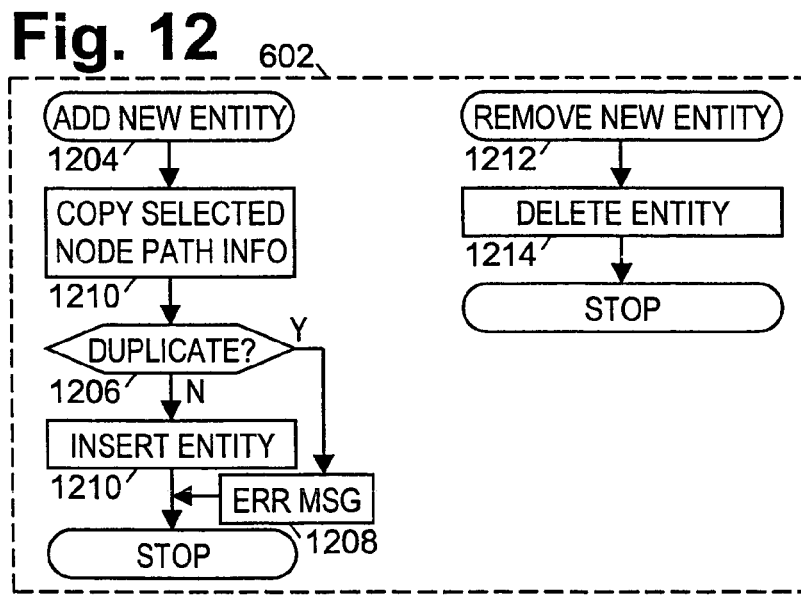

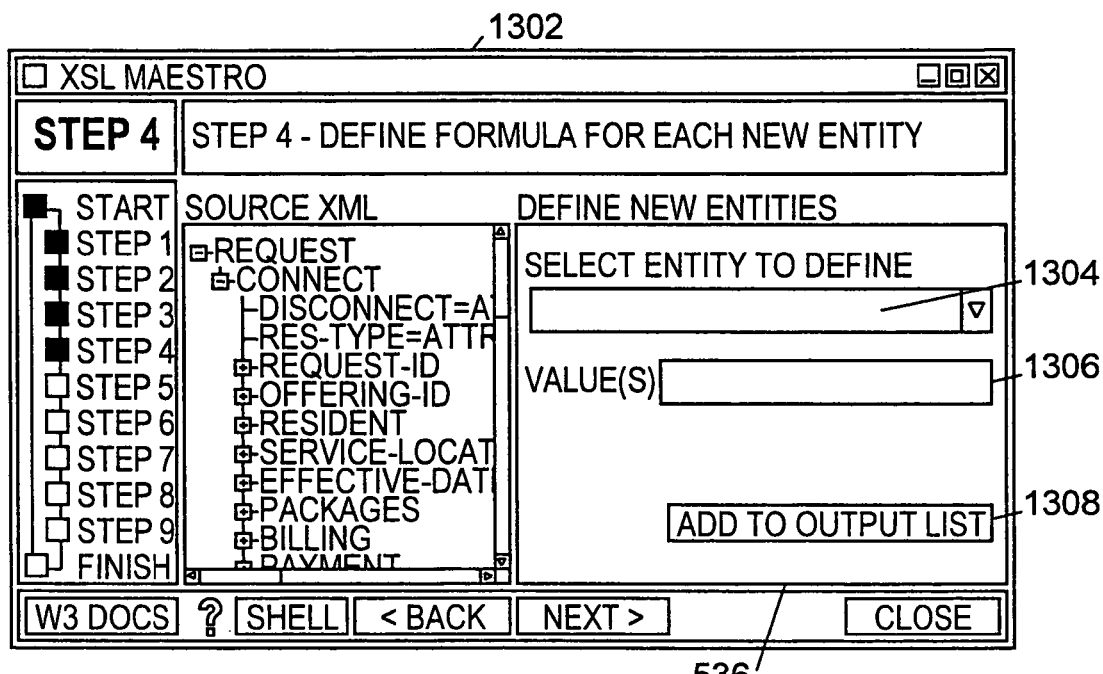
Fig. 13
Fig. 14
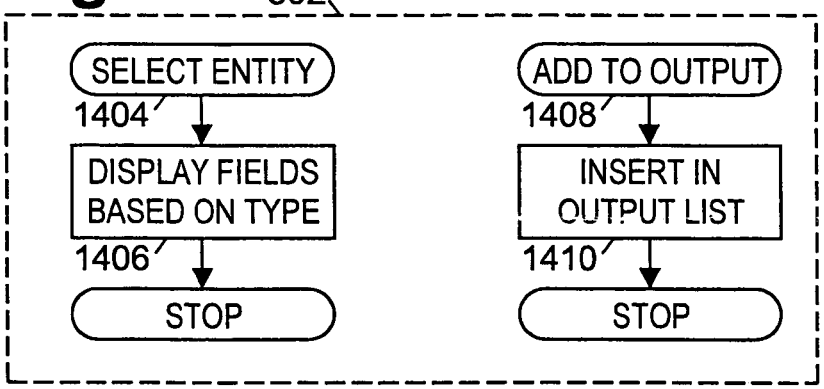

SYSTEM AND METHOD FOR GENERATING XSL TRANSFORMATION DOCUMENTS

BACKGROUND OF THE INVENTION

1. Field of the Invention

This invention generally relates to automatic code-generation systems and methods for creating transform documents. More specifically, this invention relates to a software wizard (i.e. a structured, graphical user interface) that guides users wanting to generate extensible stylesheet language ("XSL") transformation documents.

2. Description of the Related Art

The World Wide Web Consortium ("W3C") has created several international industry standards designed to facilitate the transfer of information between software applications, including those applications running in different operating systems on different computers. One of these standards is the extensible markup language ("XML").

XML documents are text documents, with embedded data tags to label and structure the data. The data tags may be of three types: an opening tag, a closing tag, or a composite tag. (A composite tag is simply abbreviated form of an opening tag immediately followed by a closing tag, and will not be discussed further.) The opening and closing tags define the boundaries of data elements in XML documents. Each opening tag must have a corresponding closing tag. Data elements can be nested, but they cannot otherwise overlap.

Data elements include the opening and closing tags and any values ("element values") or elements (hereafter termed "sub-elements" or "nested elements") enclosed by the opening and closing tags. In addition to defining the boundaries of the data element, the tags also specify the name of the data element ("element name"). Further, the opening tag may specify the name and values of one or more attributes for the data element ("attribute name" and "attribute value", respectively). The term "entities" is hereafter used to refer to elements and attributes collectively, so the term "entity name" could refer to the name of either an element or an attribute.

XML files can be mapped to a tree data structure, with nested elements being children of the elements in which they nest. Further details regarding XML can be found in C. Ashbacher, Sams Teach Yourself XML in 24 Hours, Sams Publishing: Indianapolis, ©2000, which is hereby fully incorporated herein by reference.

A primary advantage of XML is extensibility. That is, the tags are user-defined. One consequent advantage of this is human readability. The tags generally indicate the meaning of the elements they enclose, so it is easy for a reader to identify the data. This makes it much easier for programmers to extract desired data values from an XML file. Another advantage is that creating XML files takes only slightly more effort than creating normal text files.

Once W3C created the standard data language XML, they proceeded to create a standard transformation language for processing it, and called it the extensible stylesheet language ("XSL"). The XSL standard was originally intended as a way to specify a presentation format (page layout, font size, etc.) for data in XML documents. However, XSL specification includes another W3C specification called XPath, which in turn provides a transform engine called XSL-Transform, or "XSLT". XSLT is used to convert XML documents into other forms, such as other XML documents, hyper-text markup language ("HTML") documents, rich text format ("RTF") documents, portable data format ("PDF") documents, and plain-text documents. Further details regarding XSLT can be found in S. Holzner, Inside XSLT, New Riders:Boston, ©2001, which is hereby fully incorporated herein by reference.

FIG. 1 shows how the transformation process works. A transform engine (XSLT) 102 takes an input document (XML) 104, and applies a transformation document (XSL) 106 to it to produce an output document 108. A number of suitable XSLT engines 102 are readily available online, e.g., MSXSL, 4XSLT, EZ/X, iXSLT, LotusXSL, MDC-XSL, Sablotron, SAXON, Transformiix, UXT, Xalan-C++, Xalan Java, xesalt, Xport, XSL:P, and XT. The input document 104 is preferably a well-formed XML document. The transformation document 106 is an XSL document, which means that it is also a well-formed XML document. Generally, the transformation is conducted by a user invoking the transformation engine 102, and providing the names of the input document 104 and the transformation document 106.

The transformation process shown in FIG. 1 may be likened to the operation of a programming language interpreter. The user provides the interpreter (the transformation engine) with a program (the transformation document) and some program input (the input document). The interpreter follows the instructions in the program to process the program input and to produce a program output (the output document). As with any programming language, transformation document authors must learn and use the XSLT vocabulary and syntax, and must employ logic and discipline to write a successful transformation document. Consequently, the authoring of XSL transformation documents is typically left to experienced XSL programmers.

However, because XML is powerful, human readable, and can be easily understood and employed, there exists a wide audience of people that employ XML and that wish to employ XSLT. Unfortunately, many of these people lack knowledge of XSL or lack the time to author their own XSL transformation documents. A need exists for a way to enable programmers familiar with XML but less fluent in XSL to generate XSL documents easily and rapidly. Even experienced XSL programmers would benefit from a tool that automates the transformation document authoring process, as such a tool would create standardized XSL code that is compliant with a wide range of XSLT engines and that increases consistency, maintainability, and reusability of the transformation documents.

SUMMARY OF THE INVENTION

The problems outlined above are in large measure addressed by a system and method for generating XSL transformation documents. In one embodiment, a computer executes a software wizard. The wizard presents a series of screens to lead the user through the authoring process. The series of screens may include a load screen, a select screen, a new element screen, a conditional screen, a view screen, and a finish screen. The load screen prompts the user for an input document name. The wizard then retrieves the XML elements from the input document and preferably presents them to the user in an easy-to-understand tree form on the select screen. The select screen allows the user to select input document entities from the tree for inclusion in the output document. The new element screen allows the user to create new entities for inclusion in the output document. These entities are accumulated in an output list. The conditional screen allows the user to create entities based on specified conditions. The view screen allows the user to review the tentative XSL code as a transformation document that will accomplish the user's purpose. The finish screen preferably allows the user to test the transformation document on the input document and to view the resulting output document. In addition, the software wizard preferably allows the user to specify output document formats, and allows the user to re-order output entities for fixed-length and delimited output documents. At each step in the authoring process, the user is allowed to return to earlier screens to correct or modify or add to previous actions. The result is a powerful and intuitive tool for achieving the advantages of automatic code generation for XSL transformation documents.

BRIEF DESCRIPTION OF THE DRAWINGS

A better understanding of the present invention can be obtained when the following detailed description of the preferred embodiment is considered in conjunction with the following drawings, in which:

FIG. 9 is a schematic diagram of an exemplary second step screen;

FIG. 10 is a flowchart of the preferred second step screen actions;

FIG. 11 is a schematic diagram of an exemplary third step screen;

FIG. 12 is a flowchart of the preferred third step screen actions;

FIG. 13 is a schematic diagram of an exemplary fourth step screen;

FIG. 14 is a flowchart of the preferred fourth step screen actions;

FIG. 27 is a schematic diagram of an exemplary screen for definition of a new entity based on token replacement;

FIG. 28 is a schematic diagram of an exemplary screen for definition of a new entity based on stripping characters from an existing entity.

Figure 1:
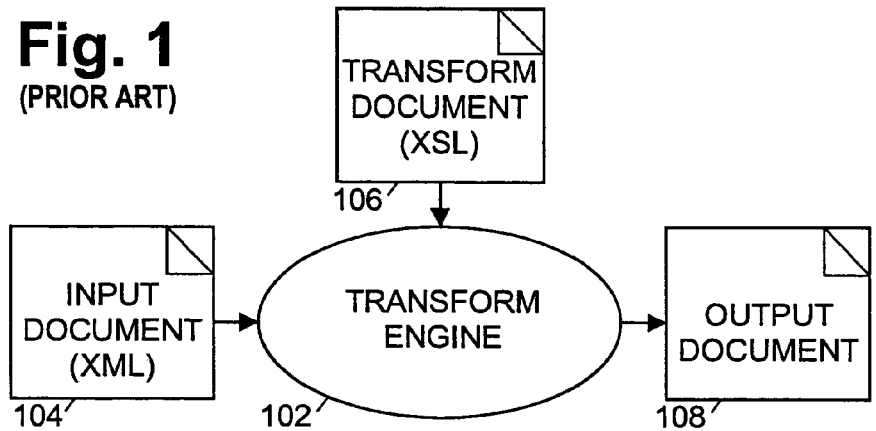
FIG. 1 is a block diagram of an XSL transformation process.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

As used herein, the term "wizard" is defined to mean a special-purpose software application designed to guide a user through a series of steps to accomplish a task. As such, it may be implemented as a stand-alone utility, or as a component included in a larger software application. The present invention contemplates a wizard for authoring XSL transformation documents. The user may invoke the wizard on a computer system such as the one shown in FIG. 2A.

Figure 2A:
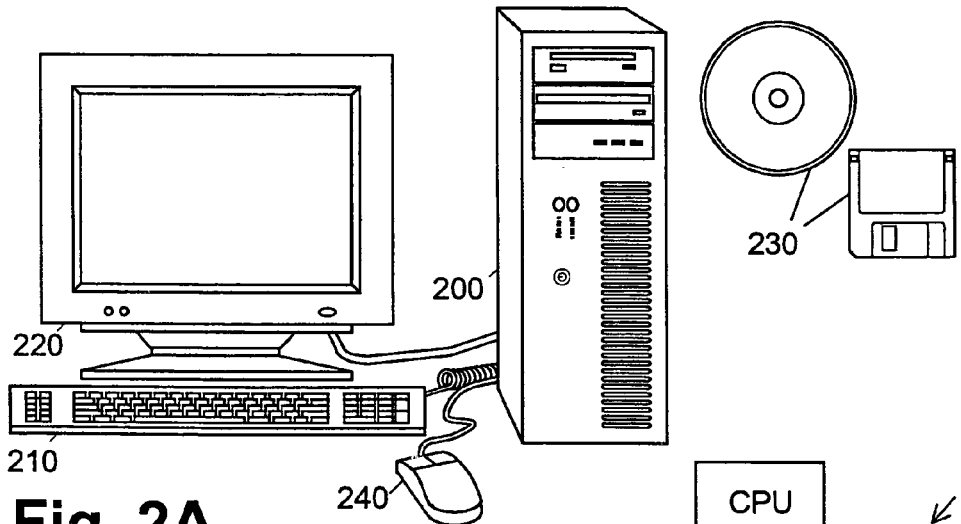
FIG. 2A is a perspective view of a computer configured to generate XSL transformation documents.

The computer system as shown in FIG. 2A includes a computer 200, one or more user input devices 210, 240, and an output device 220. Computer 200 is a standard desk-top computer tower. Output device 220 is a standard desk-top monitor, user input device 210 is a standard keyboard, and user input device 240 is a standard mouse. One of ordinary skill in the art will readily recognize that other suitable computer system configurations exist and may be employed without departing from the spirit of the invention.

The wizard application may be stored on removable information storage media 230, on internal information storage media (e.g. hard drive, ROM, RAM), and/or on remote information storage media (e.g. on other computers, servers, network disks). If stored on remote information storage media, the wizard application may be retrieved via information communication media (e.g. phone lines, networks, the Internet, wireless signals, infrared signals). The term "information carrier media" as used herein includes all types of information storage media and information communication media.

Figure 2B:
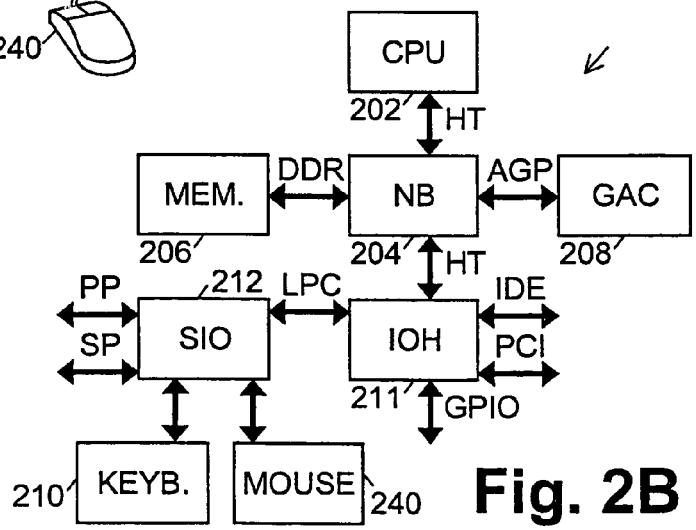
FIG. 2B is a block diagram of the computer in FIG. 2A.

FIG. 2B shows a block diagram of exemplary computer 200. Computer 200 includes a bridge logic device 204 that is herein termed the "North bridge" (NB). The North bridge 204 is a communications nexus between a processor (CPU) 202, a system memory array 206, a graphics accelerator card (GAC) 208, and an Input/Output Hub (IOH) 211. Processor 202 couples to bridge 204 via processor bus, which is preferably a HyperTranspor™ (HT) bus. Memory 206 couples to bridge 204 via a memory bus, which is preferably a double data rate (DDR) bus. Graphics accelerator card 208 couples to bridge 204 via a local bus, which is preferably an accelerated graphics port (AGP) bus. IOH 211 preferably couples to bridge 204 via a dedicated bus, which is preferably a second HT bus. This arrangement advantageously provides for high-bandwidth, low-latency communications between the processor, memory, graphics accelerator, and IOH.

IOH 211 is a chip that provides support for existing bus protocols, thereby allowing existing peripherals to interface with computer 200 without redesign. IOH 211 preferably provides an integrated drive electronics (IDE) bus interface, a PCI bus interface, a low pin count (LPC) bus interface, and one or more universal serial bus (USB) interfaces. In addition to the bus interfaces, the IOH 211 may also provide a network interface. A representative example of an IOH chip 211 is described in further detail in the Intel® 82801BA I/O Controller Hub 2 (ICH2) datasheet, dated October 2000, which is hereby incorporated by reference.

A Super I/O chip (SIO) 212 is coupled to the IOH chip 211 via the LPC bus. The SIO chip 212 provides support for basic input/output devices, such as a serial port, an infrared (IR) port, a parallel port, a floppy disk controller, a musical instrument digital interface (MIDI), a game port, a keyboard interface (for keyboard 210), and a mouse interface. An representative example of an SIO chip 112 is described in further detail in the National Semiconductor PC87366 128-Pin LPC SuperI/O datasheet, dated Jan. 11, 1999, which is hereby incorporated by reference.

To invoke the wizard on computer 200, the user may enter a command on keyboard 210, or click an icon using mouse 240. The input initiates a chain of events that cause the processor 202 to retrieve the wizard from an information carrier medium specified or implied by the command. The wizard is copied to system memory 206. Processor 202 then retrieves and executes instructions in the wizard application. Under the control of the wizard application, the processor 202 provides a graphical user interface (GUI) that prompts the user for additional input using a series of screens such as those discussed below. Upon receiving input from the user, the processor 202 performs additional tasks specified by the wizard application, generally resulting in the creation of an XSL transformation document which is typically stored in internal information storage media.

Figure 3:
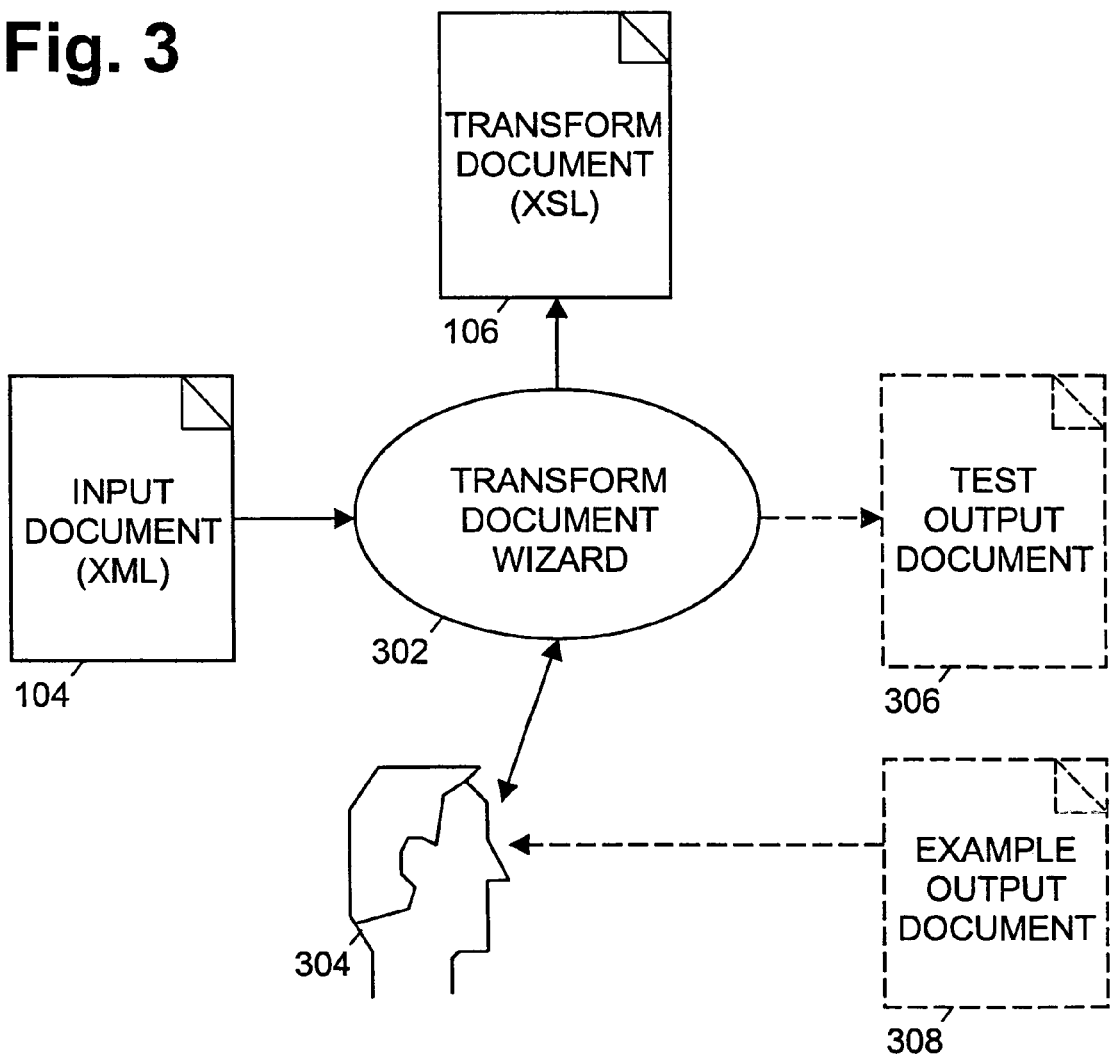
FIG. 3 is a block diagram of the preferred XSL transformation document authoring process.

FIG. 3 shows a block diagram of the preferred transformation document authoring process. A wizard 302 is invoked by a user 304 to create XSL transformation document 106. As part of the authoring process, the wizard 302 loads an XML input document 104 that will be subjected to the XSI, transform. The input document 104 provides a pool of entities that may be used as building blocks of the output document 108. The wizard 302 guides the user 304 through a process of selecting entities from the pool and specifying how the corresponding entity values should be processed to produce the output document. Once the process is completed, the wizard 302 then encodes the process into XSL form (understandable to the XSLT engine) in transformation document 106.

The wizard 302 preferably allows the user 304 to test the transformation document 106 on the input document 104. This optional step produces a test output document 306 that the user can review to determine if it is satisfactory. If it is unsatisfactory, the user 304 can move back into the process development portion of the wizard and make revisions.

In initially working through the authoring process with wizard 302, the user 304 may wish to rely on an example output document 308 as a guide. The example output document 308 may be a manually constructed mock-up of the desired transformation results from input document 104. It is expected that as the user 304 becomes familiar with the operation of wizard 302, the example output document 308 will be unnecessary.

Figure 4:
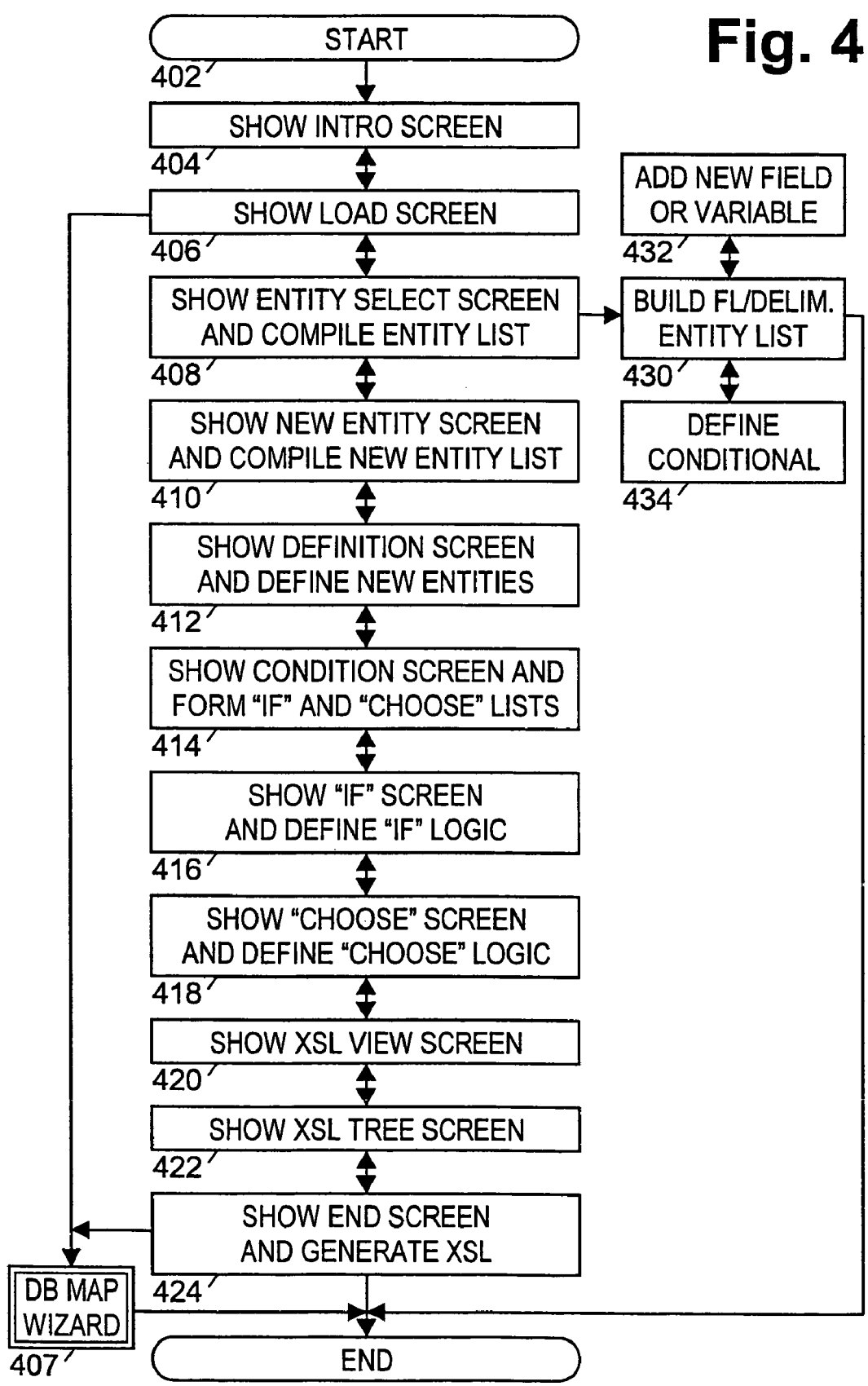
FIG. 4 is flow chart of the preferred XSL transformation document authoring process.

FIG. 4 provides an overall view of the preferred authoring process in flow chart form. Each of the blocks 404-434 in FIG. 4 generally has a corresponding user interface screen shown in later figures. Although references to these later figures are made here, a discussion of each of the screens is deferred to the detailed description of those figures.

Figure 7:
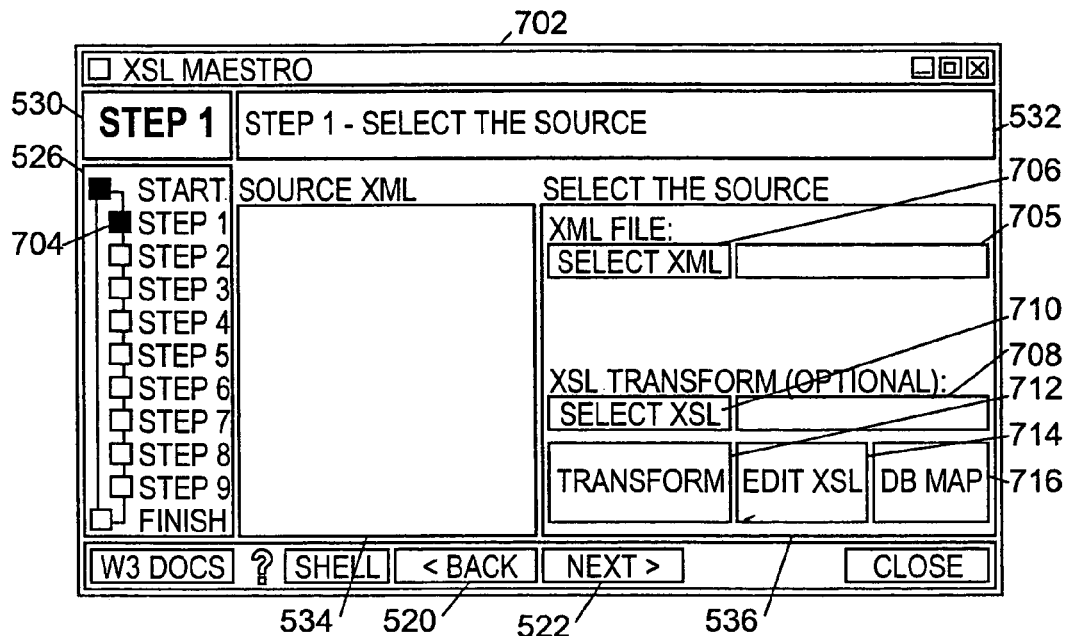
FIG. 7 is a schematic diagram of an exemplary first step screen.

After the user invokes the wizard in block 402, the wizard shows an introduction screen (FIG. 5) in block 404. The introduction screen and ensuing screens include navigation buttons to allow movement between the screens. After reviewing the welcome message on the introductory screen, the user can move forward to block 406, where the wizard shows the load screen (FIG. 7).

In block 406, the user specifies the file name of input document 104, and may optionally specify the name of an existing transformation document 106. The wizard loads the files and displays information from the input document 104. If the user specifies an existing transformation document, the user can perform additional actions, including invocation of a database ("DB") map definition wizard in block 407. Otherwise, the user progresses to block 408.

In block 407, a separate DB Map wizard is executed. The DB Map wizard allows users to build an XML mapping file for a proprietary, third party tool (XMLDBMS) which can then be used to extract information from an XML document (e.g. input document 102, or output document 108) for use with most popular database software packages. The operation of the DB Map wizard is beyond the scope of this disclosure.

When the user moves forward to block 408, the wizard shows the selection screen (FIG. 9). Here the wizard allows the user to identify entity values from the input document 104 that the user wants to appear in the output document 108. The wizard compiles a list of the selected entities, and adds each of them to an output list. Having selected a list of entities, the user may take one of multiple paths. If the output document 108 is desired to be a fixed-length format file or a delimited-list format file, the user moves to block 430 (described further below). Otherwise, the user moves forward to block 410.

In block 410, the wizard shows the creation screen (FIG. 11). Here the wizard allows the user to create new elements and attributes that the user wants to appear in the output documents 108. At this point the user names the new entities them an action type. The wizard compiles a list of these still undefined) new entities.

When the user moves forward to block 412, the wizard shows the definition screen (FIG. 13). Here, the user selects each of the new entities in turn and is prompted for a definition or formula that matches the action type. Pop-up help information provides assistance with the appropriate syntax. As the user finishes defining each new entity, the new entity is added to the output list.

Moving forward to block 414, the wizard shows a conditional screen (FIG. 15) that allows the user to select from the output list entities that the user wishes to make conditional. The user selects an entity and assigns a condition type ("if" or "choose"). The wizard builds a list of these conditional entities.

Figure 17:
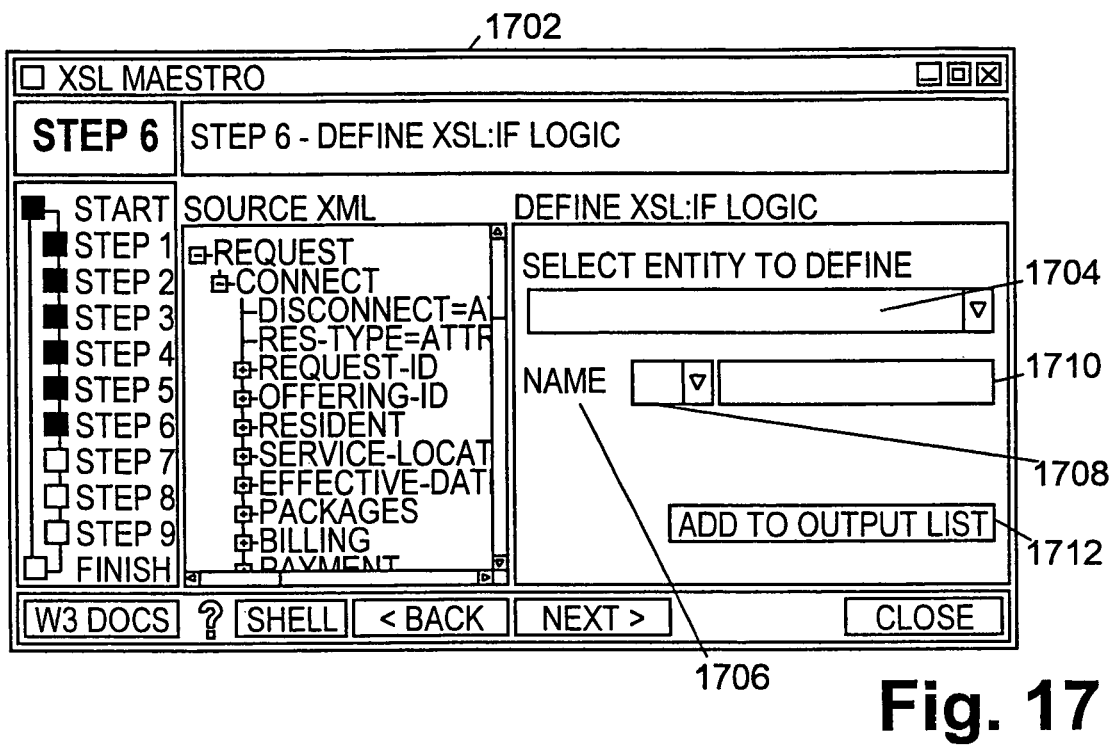
FIG. 17 is a schematic diagram of an exemplary sixth step screen.

In block 416, the wizard shows an "if logic" screen (FIG. 17). In this screen, the user can select each of the "if"-conditioned entities and be prompted for a definition or formula of the condition. Pop-up help information provides assistance with the appropriate syntax. As the user finishes defining each condition, the condition is attached to the entity in the output list.

Figure 19:
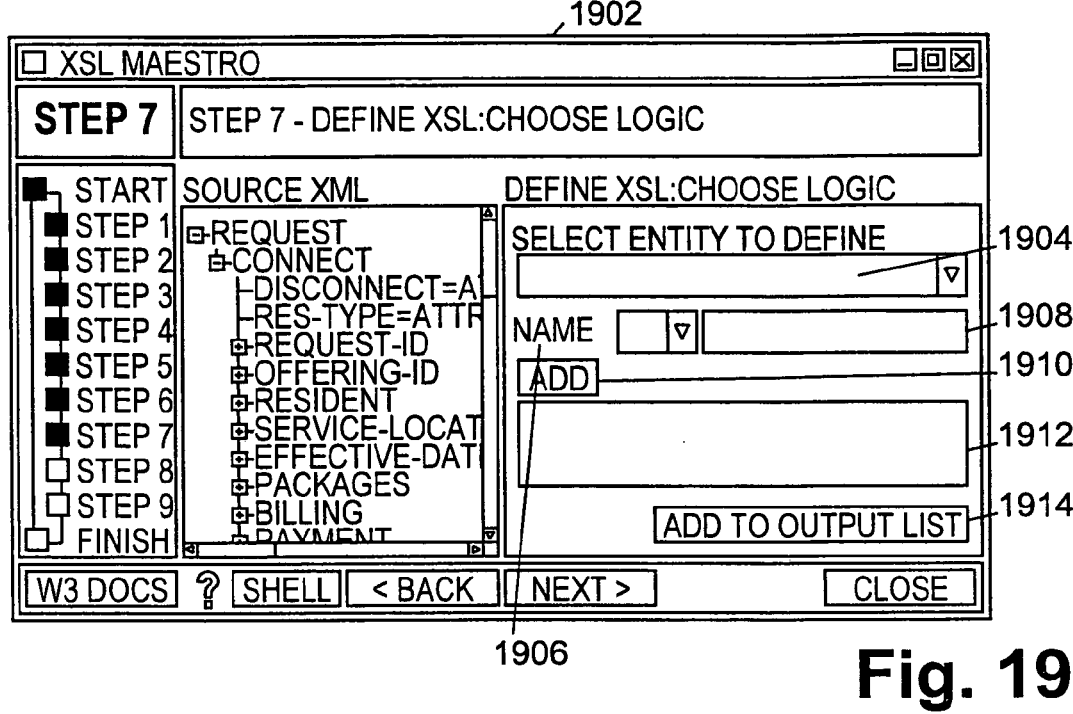
FIG. 19 is a schematic diagram of an exemplary seventh step screen.

In block 418, the wizard shows a "choose logic" screen (FIG. 19). In this screen, the user can select each of the "choose"-conditioned entities and be prompted for a definition or formula of the conditions. Again, pop-up help information provides assistance with the appropriate syntax. As each condition is finished, the conditions are attached to the entity in the output list.

From block 418, the user can move forward to a view screen (FIG. 21) in block 420. Here the wizard generates a view of the proposed transformation document. Those users familiar with XSLT can review the transformation document to verify that it reflects their intent. Moving forward to block 422, the wizard also provides an output tree screen (FIG. 22). The wizard provides a tree view of the proposed transformation document. The tree view is more concise and may be more comprehensible to most users.

Figure 23:
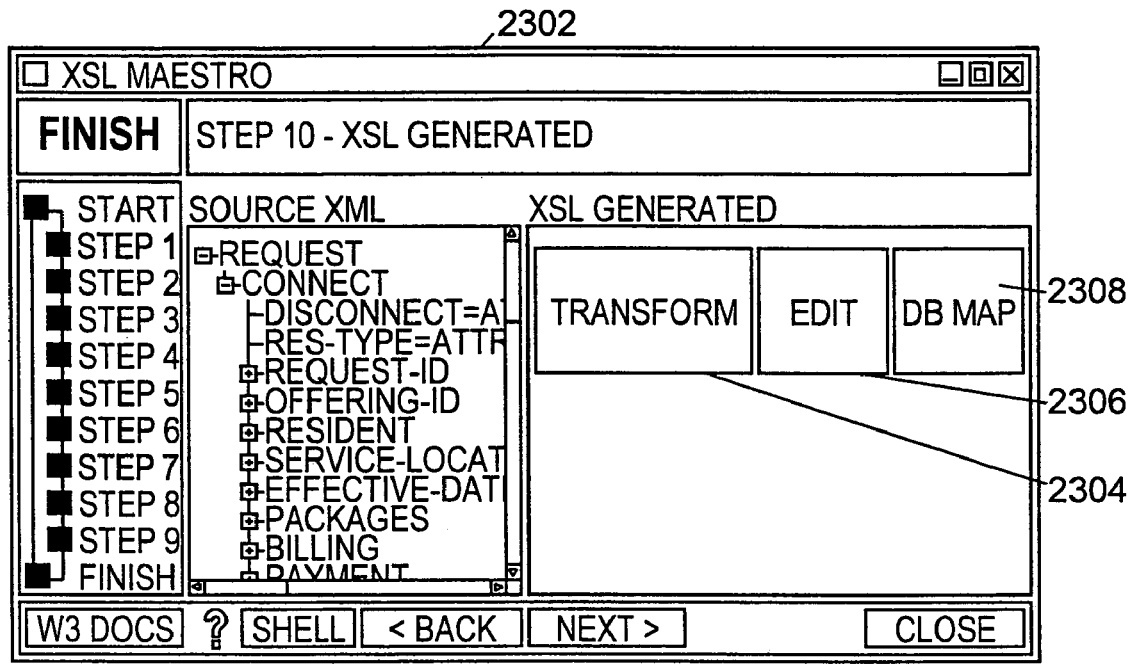
FIG. 23 is a schematic diagram of an exemplary finish step screen.

The user can progress from block 422 to block 424, where the wizard shows the finish screen (FIG. 23). In block 424, the wizard creates the transformation document 106, and preferably allows the user to test the transformation document 106 on input document 104. The resulting output document 108 is preferably shown in a separate window. The wizard may also allow the user to manually edit the transformation document 106, and may allow the user to invoke a separate wizard to augment the transformation document 106 with a database map. The user can also exit the wizard from this block, having successfully created the desired transformation document.

Figure 24:
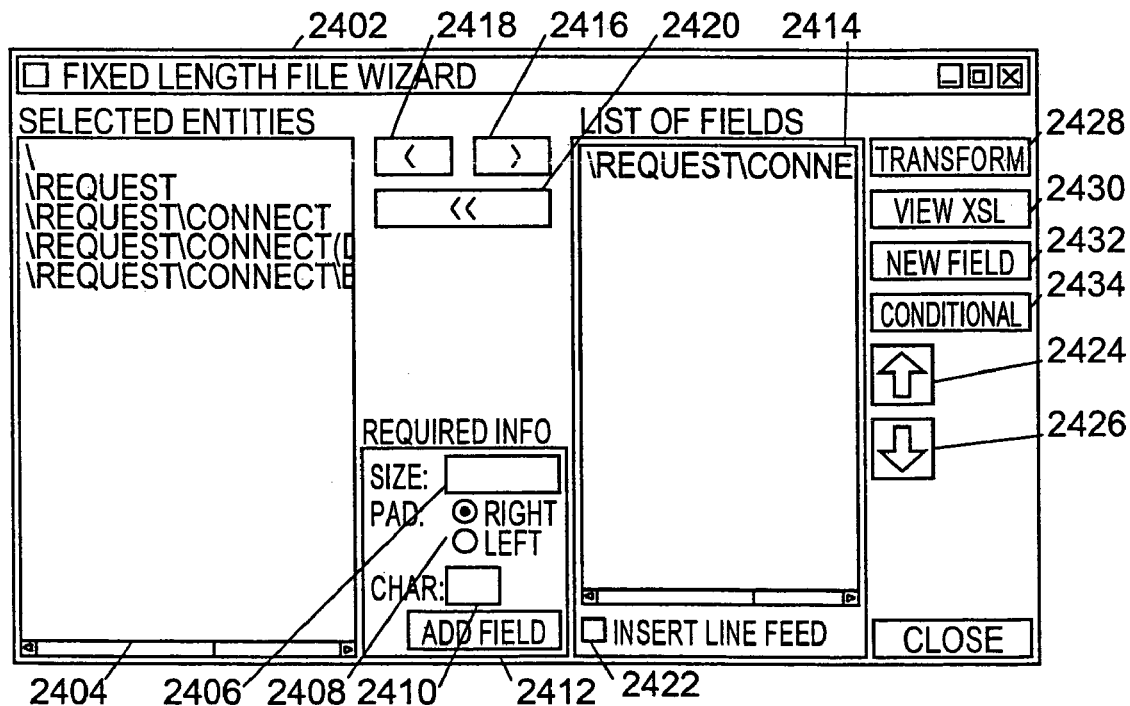
FIG. 24 is a schematic diagram of an exemplary screen for a template-based fixed-length file wizard.

Returning now to block 430, if the user has indicated that the output document 108 should have a fixed length format, then the wizard displays a fixed-length file definition screen (FIG. 24). A similar screen is presented if the user indicates that a delimited format is desired. Due to the similarity of the screens, only the fixed-length file definition screen is provided. The differences are detailed in the discussion of FIG. 24 below. Both the fixed-length file definition screen and the delimited file definition screen allow the user to specify a sequence of entity values that are to appear in the output document 108. The user also has the option of adding new entities (block 432) to the sequence and defining conditional logic (block 434) for the sequence. Once the user has finished specifying the sequence, the wizard creates the transformation document 106 and preferably allows the user to view and test the transformation document 106. The user can also exit the wizard from this screen.

In block 432, the wizard presents a new entity definition screen (FIGS. 25–28) which allows the user to name the entity, select an action type, define the new entity based on the action type, and specify a position for the new entity in the output sequence. When done, the user is returned to block 430.

Figure 29:
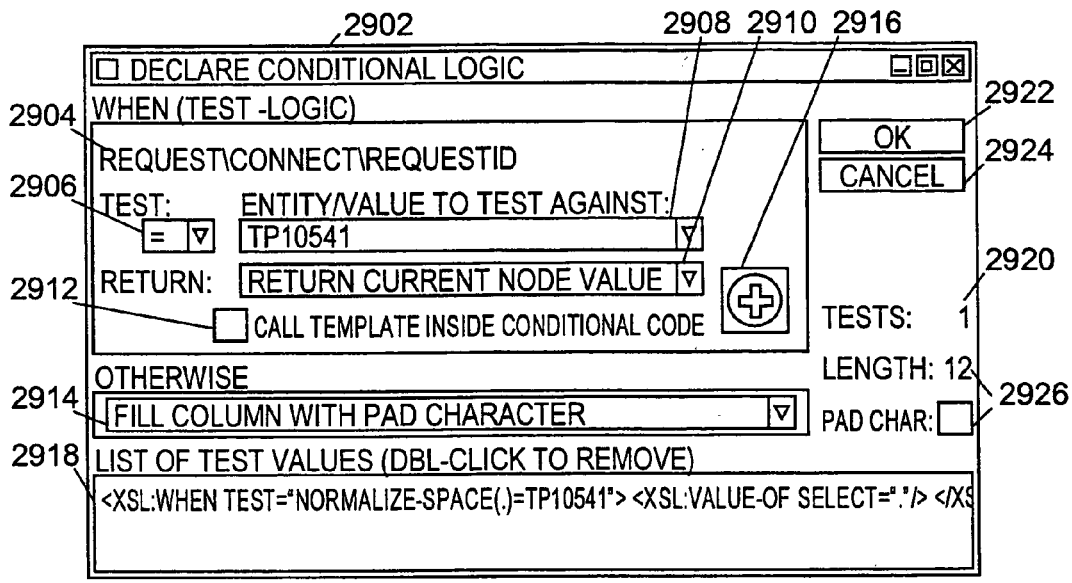
FIG. 29 is a schematic diagram of an exemplary screen for definition of conditional logic.

In block 434, the wizard presents a define conditional logic screen (FIG. 29) which allows the user to attach conditional logic to a entity in the sequence list. When done, the user is returned to block 430.

At any point in the process, the user can return to an earlier block, and the information that has already been entered will be retained. This allows the user to remove, modify or add elements to the output list.

In the preferred embodiment, the wizard 302 is written in Visual Basic. Each of the screens is an event-driven module that responds to user input. As the user clicks a mouse or types keys on a keyboard, the wizard calls modules to implement the various options offered by the currently-displayed screen. Each of the screens and corresponding modules are discussed in turn below. The relationship between user actions and the created XSL transformation document will also be described.

Figure 5:
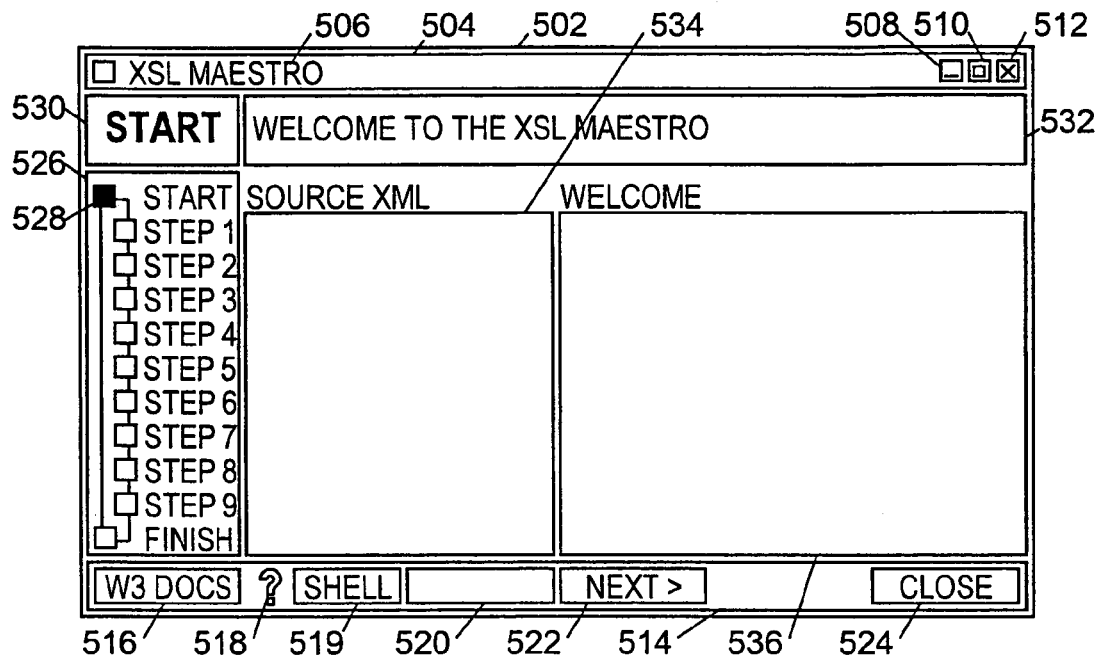
FIG. 5 is a schematic diagram of an exemplary welcome screen.

FIG. 5 shows the welcome screen 502, which preferably includes a title bar 504 having the wizard title 506 (shown in the figure as "XSL Maestro") and the traditional icons for minimize (508), maximize (510), and close (512). Also included in welcome screen 502 is a navigation bar 514 having a documentation button 516, a help icon 518, a shell button 519, a back button 520, a next button 522, and a close button 524. (In the welcome screen 502, the back button is disabled because there are no preceding wizard screens.) The function of the navigation bar options is described below in reference to FIG. 6.

Further included in the welcome screen 502 are the progress display 526, the screen label 530, the screen message 532, the source window 534, and the work window 536. Progress display 526 includes a list of the wizard screens in order. Next to each screen is an indicator that changes color as the user reaches that step of the authoring process. In FIG. 5, the start indicator 528 is darkened. The screen label 530 identifies the present step of the authoring process, and the screen message 532 provides a phrase that describes the purpose of the present step.

The source window 534 is intended to display the contents of the input document 104, but at this point in the authoring process, the window is empty. The work window 536 is intended to display prompts and entry fields for the current step of the authoring process. Here, the work window 536 preferably displays a welcoming image, e.g. a company logo.

To aid and increase the comfort level of the user, the structure of the welcome screen 502 is preferably preserved throughout each of the steps in the authoring process. Accordingly, the title bar 504 and navigation bar 514 are preferably preserved unchanged in each of the remaining screens, although some of the buttons (e.g. the back button) may be disabled if unsuitable in the current context. Similarly, the progress display 526, screen label 530, screen message 532, and work screen 536 are preferably present in each of the remaining screens, with their content updated as appropriate to the current context. The source window 534 (once the input document is loaded) allows the user to view elements from the input document 104. This window remains available for the user throughout the authoring process. It is described further below.

Figure 6:
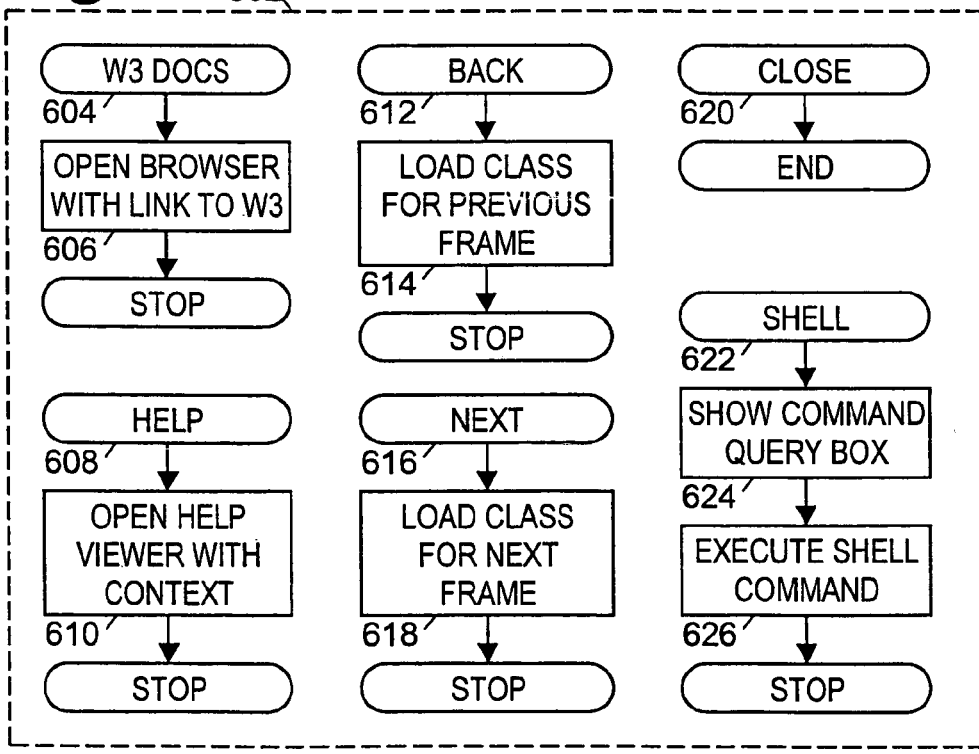
FIG. 6 is a flowchart of the preferred welcome screen actions.

The only user actions allowed in the welcome screen 502 are those presented in the navigation bar 514. FIG. 6 shows navigation routines in a collection 602 of the wizard's routines that are activated by these actions.

Pressing the documentation button 516 invokes the documentation routine 604. In block 606, this routine opens the default web browser in a separate window and provides the browser with a link to the W3C website where documentation for XML and XSL may be accessed and reviewed. These are primarily reference materials intended for those users wanting to understand nuances of certain language structures. The routine then terminates.

Clicking the help icon 518 triggers the help routine 608. In block 610, this routine opens a help viewer with a pointer to a local help file, and provides the viewer with the current position in the authoring process. The routine terminates after opening the viewer. The help viewer is opened in a separate window, and preferably is able to use the information from the wizard to provide relevant advice to the user.

The help viewer may also allow searching if the user is seeking other advice regarding the operation of the wizard.

Pressing the shell button 519 initiates the shell routine 622. In block 624, the wizard presents a query box that allows the user to enter a command. The wizard then in block 626 executes the command in a separate window. This allows the user to invoke, among other things, a text editor, a browser, and alternative XSLT engines. When entering a command, the user is preferably allowed to use abbreviations for the name of the input document file (e.g. "$2") and transform document file (e.g. "$1"). If the names of these files have been previously provided to the wizard, the wizard will substitute the full pathnames of the files for the abbreviations.

Pressing the back button 520 (when enabled) invokes the back routine 612. The back routine in block 614 moves the wizard back to a previous screen, and then terminates. Similarly, pressing the next button 522 invokes the next routine 616, which in block 618 moves the wizard forward to the next screen in the authoring process.

Pressing the close button 524 initiates the close routine 620. The close routine 620 shuts down the wizard application.

Each of the routines in collection 602 is also made available in each of the remaining screens. Later figures will show additional routines that exist in collection 602.

Figure 8:
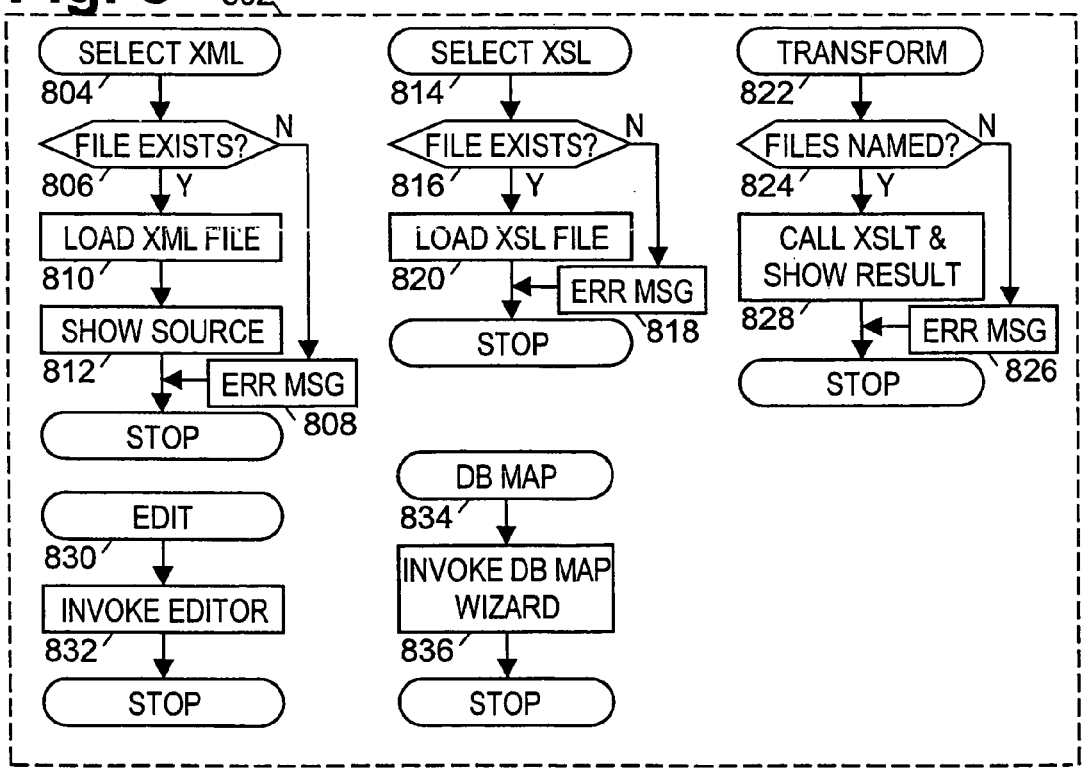
FIG. 8 is a flowchart of the preferred first step screen actions.

FIG. 7 shows load screen 702. Note that the structure is preferably the same as welcome screen 502. Notably, however, the back button 520 is enabled, and the progress screen 526, the screen label 530, the screen message 532, and work window 536 have been updated. The second indicator 704 in the progress window 526 is now darkened. In the work window 536, the wizard presents an input document name entry field 705, an input document load button 706, a transformation document name entry field, a transformation document load button 710, a transform button 712, an edit button 714, and a database map button 716. FIG. 8 shows the collection of routines 802 that implement the operations in the work window 536.

Referring to both FIGS. 7 and 8, the user enters the name of an XML input document in text entry field 705 and presses load button 706. This invokes input document load routine 804. In block 806, the routine verifies the existence of the input document file. If the file cannot be found (due perhaps to a typographical error), the routine generates an error message in block 808, and terminates. If the file is found, then in block 810, the routine loads the input document, and in block 812 it shows the contents of the input document in source window 534. The user can then move to the next screen by pressing next button 522.

Alternatively, the user can specify a transformation file in field 708 and press button 710. This initiates transformation document load routine 814. In block 816, the routine determines if the transformation document file exists, and if not, generates an error message in block 818. If the transformation document file is found, the routine in block 820 loads the transformation file and terminates.

If both the input and transformation documents have been loaded, the user can press one of the transform, edit, or database map buttons. Pressing the transform button 712 invokes the transform routine 822. In block 824, the routine verifies that both files have been loaded. If not, an error message is provided in block 826, and the routine terminates. Otherwise, in block 828 an XSLT engine is called to apply the transformation document to the input document, thereby generating an output document. The routine preferably displays the output document in a separate window before terminating.

Pressing edit button 714 initiates the edit routine 830. In block 832, the routine calls a text editor and provides the name of the transformation document. (Only the transformation document may be edited, not the input document). The user then uses the editor in the normal manner, saving his work and exiting when done. When the editor terminates, the routine re-loads the newly-edited transformation document in block 834 and terminates.

Pressing database map button 716 starts the database map routine 836. The database map routine launches a separate wizard that allows the user to map XML data to any commonly used database format using a proprietary, third party software package (XMLDBMS).

FIG. 9 shows the selection screen 902. The step 2 indicator 904 is darkened in the progress display 904. The source window 534 now shows an XML tree 906 for a representative input document 104. The work window 536 shows a display field 908 for the output list. Both source window 534 and display field 908 are provided with scroll bars if the contents extend beyond the boundaries.

The XML tree 906 is shown in outline format. Each element of the input file may have attributes, element values, and sub-elements. Those entities having one or more attributes, element values, and/or sub-elements are shown with an adjacent plus/minus icon, while those entities not having any attributes, element values, or sub-elements are shown without any such icon. The icon is shown with a plus ("+") if the element has attributes, element values, or sub-elements that are not shown, and shown with a minus ("−") if all of the element's attributes, element values, and sub-elements are shown. A user can click the icon to change its state. Clicking a plus icon for an element causes the wizard to expand the tree 906 by showing all the attributes, element values, and sub-elements of that element. These sub-elements are indented below the element, and are connected to the element by a (possibly branching) line. Conversely, clicking a minus icon for an element causes the wizard to reduce the tree by hiding all the attributes, element values, and sub-elements of the element. These operations are provided by the expand/reduce routine 1003 in collection 602 (see FIG. 10). Clicking a plus/minus icon invokes the routine, and in block 1004, the routine re-draws the XML tree 906 as appropriate.

Referring to both FIGS. 9 and 10, the user manipulates the tree 906 to locate the desired entities, and double clicks the entities in window 534. This invokes add-entity routine 1005. In block 1006, the routine determines if the entity is already in the output list. If so, the routine generates an error message in block 1008 and stops. Otherwise, in block 1010, the routine adds the entity to the output list in display field 908, and re-sorts the list in block 1012 to maintain the elements in their original order (the order in the input document).

The output list is shown in display field 908. An illustrative list is shown in FIG. 9. The root element ("/") is provided by default and cannot be removed. To remove an entity from the list, the user double clicks on the entity in display field 908. This invokes remove entity routine 1014. In block 1016, the routine checks to verify that the entity is not the root element, and if it is, an error message is generated in block 1018. Otherwise, the entity is removed in block 1020, and the list redrawn without the entity.

After this step, there are three types of entities in the output list: the root node, element nodes, and attribute nodes.

Element nodes and attribute nodes can be sub-entities of the root node or other element nodes. When the wizard creates the transformation document, it will begin with the root node and work its way down the list. For XML output documents (fixed-length format and delimited format output documents are described further below), the wizard transcribes the root node as follows in the transformation document:

```
<?xml version="1.0" encoding="utf-8"?>
<xsl:stylesheet xmlns:xsl="http://www.w3.org/1999/XSL/Transform" version="1.0">
<!-- Copyright 2001. Qcorps Residential, Inc. All rights reserved -->
    <xsl:strip-space elements="*" />
    <xsl:output method="xml" indent="yes"/>
    <xsl:template match="/">
        SUB-ELEMENTS (IF ANY) INSERTED HERE
    </xsl:template>
</xsl:stylesheet>
```

Thus, the root node is translated into the skeleton of a transformation document. The wizard inserts any sub-entities at the point indicated, preferably with additional indentations to indicate the nesting level.

The wizard translates element nodes as follows (a node named "Request" is used as an example):

```
<Request ATTRIBUTES (IF ANY) INSERTED HERE>
    <xsl:for-each select="Request">
        <xsl:value-of select="text( )"/>
        SUB-ELEMENTS (IF ANY) INSERTED HERE
    </xsl:for-each>
</Request>
```

Thus, element nodes are translated into a command to copy the text from the specified elements in the input document to corresponding elements in the output document. Any sibling elements (i.e. element nodes in the output list that have the same parent as the Request node), will be translated in turn (i.e. in document order) immediately after the Request node.

If the element node has any attribute nodes, the values are inserted at the indicated point. (Attributes are inserted only at "ATTRIBUTES (IF ANY) INSERTED HERE", not at SUB-ELEMENTS (IF ANY) INSERTED HERE). For example, if a node named "Connect" has as a sub-entity an attribute node named "Disconnect" with a attribute value "No", the wizard will generate the following in the transformation document:

```
<Connect Disconnect="No">
    <xsl:for-each select="Connect">
        <xsl:value-of select="text( )"/>
        SUB-ELEMENTS (IF ANY) INSERTED HERE
    </xsl:for-each>
</Connect>
```

The ensuing screens will cause other types of entities to be added to the output list. These are discussed further below.

FIG. 11 shows the creation screen 1100. The step indicator 1102 in the progress display is darkened. The work window includes a name entry field 1104, a series of node types 1106 that may be selected using radio button icons, scroll box 1108 for selecting a parent, an add button 1110, and a new entity list display field 1112.

To create a new element, the user enters the name for the new entity in box 1104, selects a node type (also termed an action type) 1106, selects a parent node from the output list (i.e. the new entity will be a sub-entity of the entity selected from the list) in scroll box 1108, and presses the add button 1110. This invokes the add new entity routine 1204 (FIG. 12). In block 1206, the routine verifies that the name is valid (e.g. no spaces, not a duplicate name, etc.), and if so, inserts the name in a new entity list. Otherwise, an error message is displayed in block 1208, and the user is allowed to revise the information.

The new entity list is displayed in field 1112. By double-clicking on entities in the field 1112, the user invokes remove new entity routine 1212, which simply removes the entity from the new-entity list in block 1214.

There are five possible new node types. These are: Token Replace, Copy Whole, Concatenate, Strip, and Constant Value. Token replace is used for replacing one or more characters in an element value with other characters. Copy Whole is used for copying an element of the input document to the output document, along with all of the sub-entities of that element. Concatenate is used for combining element values together. Strip is used for removing characters from an element value in the input document. Constant Value is used for inserting a constant value in the output document.

FIG. 13 shows the definition screen 1302. To provide definitions of the new elements, the user selects an element from the new-entity list in scroll box 1304. This invokes select entity routine 1404 (FIG. 14). In block 1406, the routine determines the type of new element, and displays the appropriate entry fields in work window 536. In the example shown in FIG. 13, an entry field 1306 is provided for a new constant value element. For a Token Replace element, an entry field is provided for the character string to be replaced, and another entry field is provided for replacement character string. For the Copy Whole element, the work window shows an entry field for the name of the element to be copied, and a check-box option is provided to indicate whether only the sub-elements are to be copied, or whether the attribute and element values of the named element should also be copied along with the sub-elements. For a Concatenate element, an entry field is provided for the names of the fields to be concatenated. For a Strip element, fields are provided for entering the number of characters to be removed or retained, and for indicating whether the characters should be removed from the left or right end of the string.

Once the user has entered the information requested, the user presses add button 1308. This invokes routine 1408. In block 1410, the routine inserts the newly-defined entity in the output list. Note that newly added elements will also appear as potential parent elements in scroll box 1108 (FIG. 111) if the user returns to that screen.

Accordingly, the output list may now contain five additional element types. When creating the transformation document, the wizard translates these elements as follows.

A Token Replace element named "RequestID" that is to replace occurrences of "TP" with "SP" will be translated as follows:

```
<RequestID ATTRIBUTES (IF ANY) INSERTED HERE>
    <xsl:for-each select="RequestID">
        <xsl:value-of select="translate(.,'TP','SP')"/>
```

-continued

```
        SUB-ELEMENTS (IF ANY) INSERTED HERE
    </xsl:for-each>
</RequestID>
```

A Copy Whole element named "NewConnect" that is to copy an input document element named "Connect", along with all the sub-elements of Connect, will be translated as follows:

```
<NewConnect>
    <xsl:for-each select="Connect">
        <xsl:copy-of select="*"/>
    </xsl:for-each>
</NewConnect>
```

A Concatenate element named "Combined" that is to be a concatenation of two input document elements named "First" and "Second" will be translated as follows:

```
<Combined ATTRIBUTES (IF ANY) INSERTED HERE>
    <xsl:for-each select="First">
        <xsl:value-of select="text( )"/>
    </xsl:for-each>
    <xsl:for-each select="Second">
        <xsl:value-of select="text( )"/>
    </xsl:for-each>
    SUB-ELEMENTS (IF ANY) INSERTED HERE
<Combined>
```

A Strip element named "Stripped" that is to be the first letter of an input document element named "MiddleName" will be translated as follows:

```
<Stripped ATTRIBUTES (IF ANY) INSERTED HERE>
    <xsl:for-each select="MiddleName">
        <xsl:value-of select="substring(text( ),1,1)"/>
        SUB-ELEMENTS (IF ANY) INSERTED HERE
    </xsl:for-each>
</Stripped>
```

A Constant Value element named "ConstantValue" that is to contain the value "ANY VALUE" will be translated as follows:

```
<ConstantValue>ANY VALUE</ConstantValue>
```

This element type may be used by experienced XSL programmers to insert native XSL commands that may be unsupported by the wizard. The wizard will dutifully copy the typed values into the transformation document where they can be found and applied by the XSLT engine.

Figure 15:
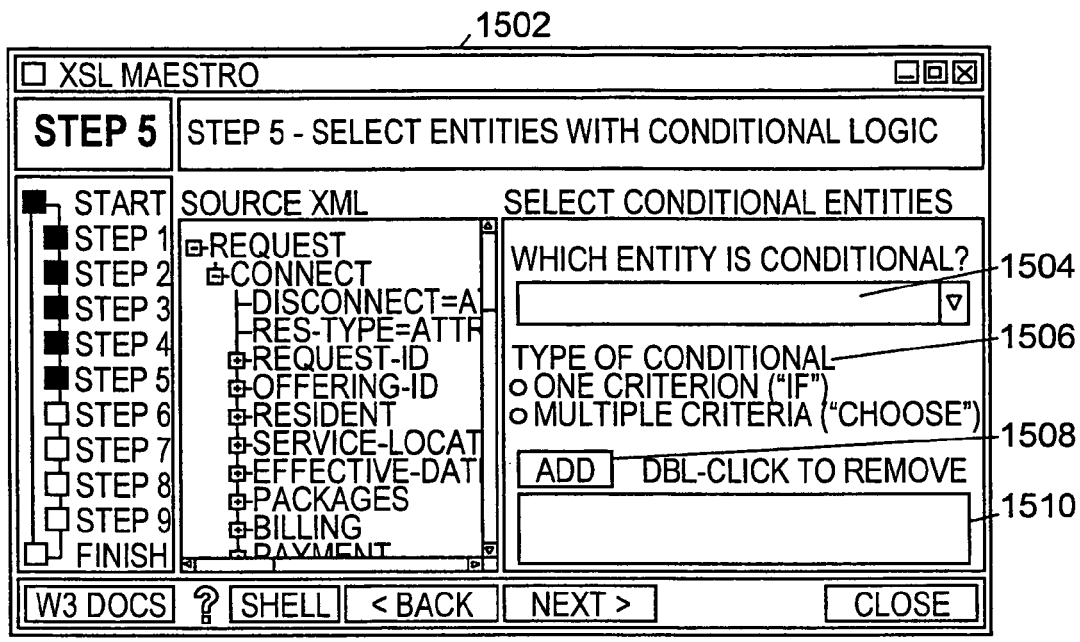
FIG. 15 is a schematic diagram of an exemplary fifth step screen.
Figure 16:
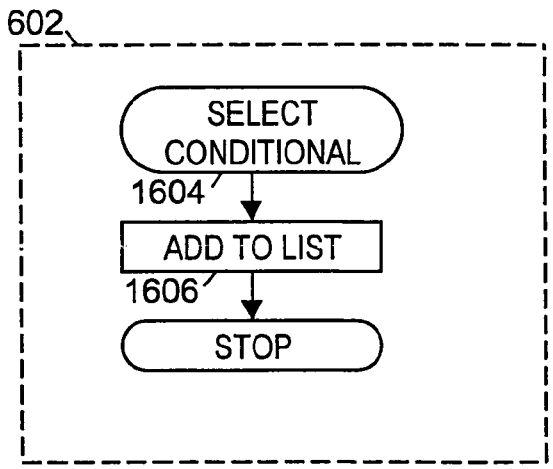
FIG. 16 is a flowchart of the preferred fifth step screen actions.

FIG. 15 shows the conditional screen 1502. Here the user uses scroll box 1504 to select output list entities that the user wishes to make conditional. The condition type 1506 is selected using one of two radio buttons. One indicates that there is only condition to be tested for ("if"), and the other indicates that there are multiple alternative conditions, each with a corresponding effect if true ("choose"). After selecting the condition type, the user presses the add button 1508. This invokes select conditional routine 1604 (FIG. 16). In block 1606, the wizard adds the entity to a list of selected conditionals, and displays the list in field 1510. If the conditional type is of the "choose" type, the user is prompted for additional elements to be grouped with the conditional.

Figure 18:
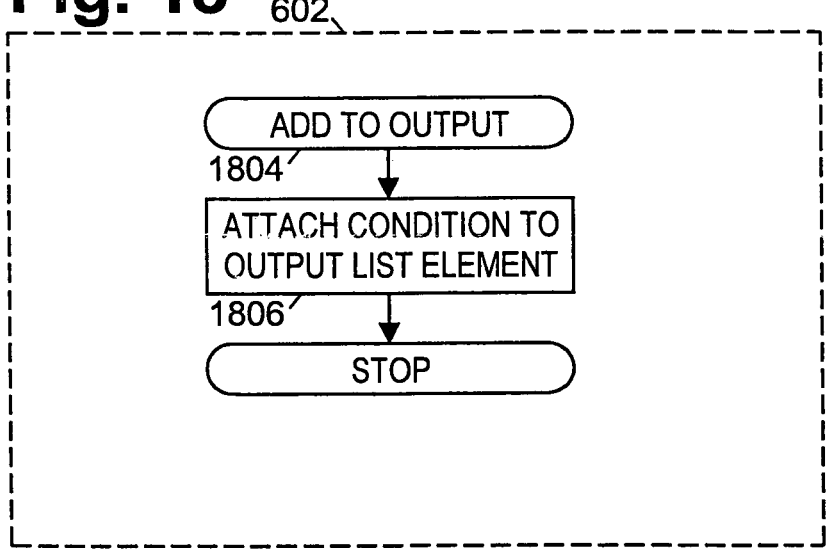
FIG. 18 is a flowchart of the preferred sixth step screen actions.

In FIG. 17, the user is able to define the logic for the "if" conditional elements. The "if logic" screen 1702 includes a scroll box 1704 that the user employs to select one of the if-type conditional elements identified in the previous screen. The name of the element is echoed at a position 1706 in front of a relational operator scroll box 1708 and a formula entry field 1710. The relational operator scroll box 1708 is used to select one of the relational operators (i.e., "=", "!=", "<", ">", "<=", or ">="), and the formula entry field 1710 is used to type a value or formula. After the user finishes the formula, the add button 1712 is pressed, and the condition is attached to the element in the output list in block 1806 of add routine 1804 (FIG. 18). Further detail on how the condition is attached will be provided when the preferred underlying data structure of the output list is described below.

The wizard translates the element with an attached "if" condition in the following manner. Assume the element name is "State", with a constant element value "Texas", and has no sub-elements. Further assume that the condition is "='TX'". The following code appears in the transformation document:

```
<xsl:for-each select="State">
    <xsl:if test="State='TX'">
        <State>
            Texas
        </State>
    </xsl:if>
</xsl:for-each>
```

Figure 20:
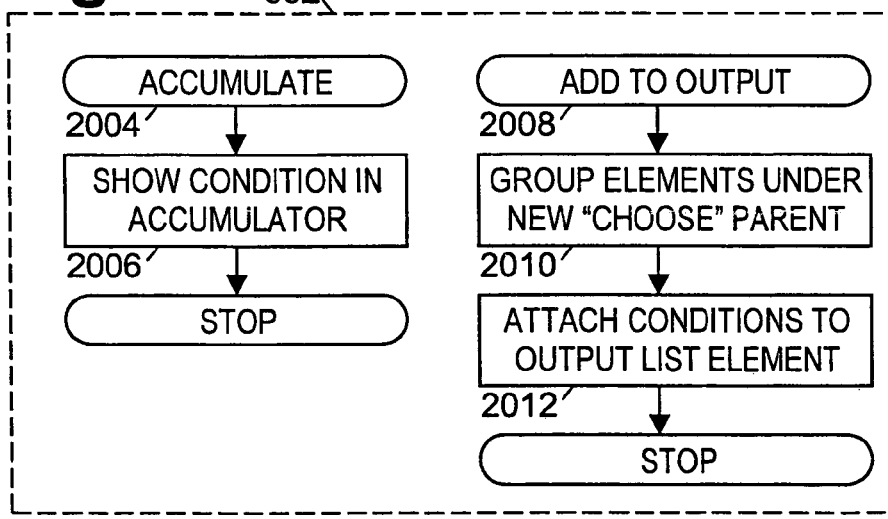
FIG. 20 is a flowchart of the preferred seventh step screen actions.

FIG. 19 shows the "choose logic" screen 1902. As before, a scroll box 1904 is provided for the user to select one of the choose-type conditional elements identified earlier in the conditional screen. The name of the element is echoed at position 1906 in front of a relational operator scroll box and formula entry field 1908. After the user enters the operator and formula, the user presses the add button 1910. This invokes accumulate routine 2004 (FIG. 20). In block 2006, the accumulate routine adds the defined element to a list in accumulator box 1912.

Once the user finishes defining each of the conditions for the current "choose" structure, the user presses the add to output button 1914. This invokes add-to-output routine 2008. In block 2010, the routine adds a new element to the output list, and makes each of the elements in the accumulate box a child of the new element. In block 2012, the user-defined conditions are attached to the corresponding choose-type child elements.

The wizard translates the choose parent element as follows:

```
<xsl:choose>
    CHOOSE-CHILD1 INSERTED HERE
    CHOOSE-CHILD2 INSERTED HERE
    . . .
```

-continued

```
        LAST CHOOSE-CHILD INSERTED HERE
        OTHERWISE (IF ANY) INSERTED HERE
    </xsl:choose>
```

Each of the children of the choose parent is then translated in similar fashion to the "if"-type elements, substituting "when" for "if":

```
    <xsl:when test="State='TX'">
        <State ATTRIBUTES (IF ANY) INSERTED HERE>
            Texas
            SUB-ELEMENTS (IF ANY) INSERTED HERE
        </State>
    </xsl:when>
```

The otherwise clause is similar, but uses the tags <xsl:otherwise> and </xsl:otherwise> without a condition.

Figure 21:
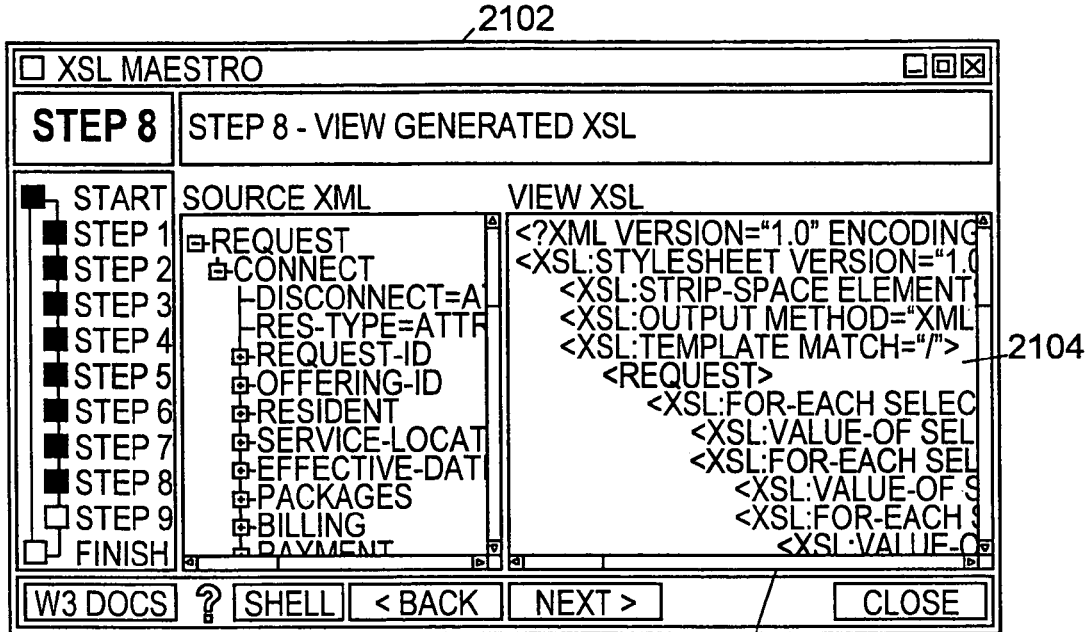
FIG. 21 is a schematic diagram of an exemplary eighth step screen.
Figure 22:
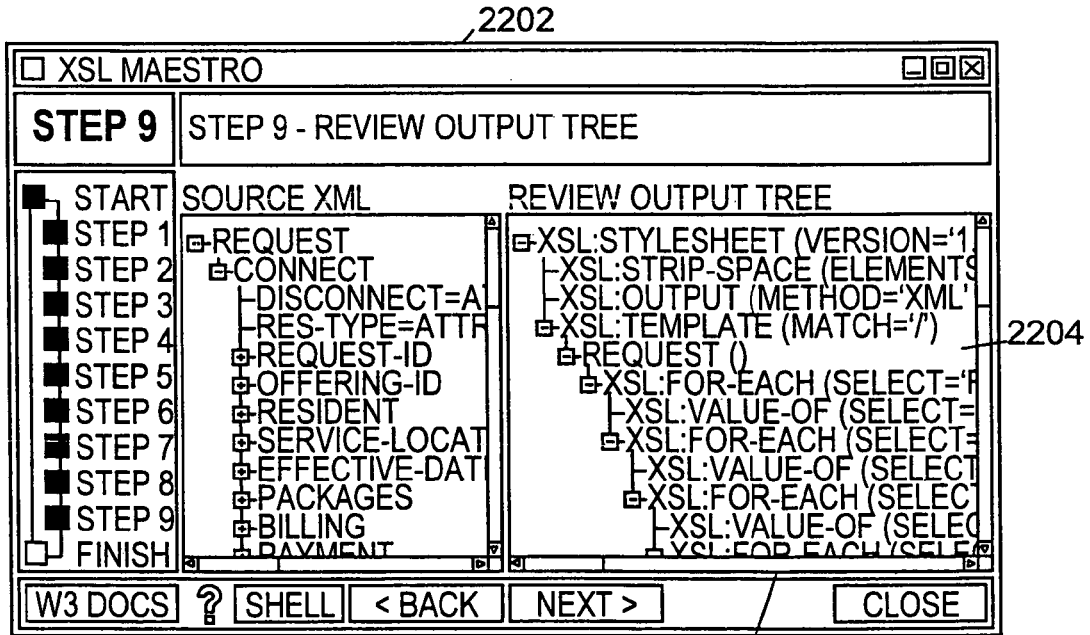
FIG. 22 is a schematic diagram of an exemplary ninth step screen.

FIG. 21 shows view screen 2102. This screen provides a tentative listing 2104 of the transformation document as it would appear in final form. The transcriptions of the various element types provided above are employed to determine this tentative listing. The user can review the transformation document to verify the operation of wizard 302.

FIG. 22 shows tree screen 2202, which shows the transformation document in tree form 2204. As with the source document tree, elements of the transformation document having sub-elements are provided an adjacent plus/minus icon. The user can use these icons to expand and reduce the tree, thereby invoking an expand/reduce routine which redraws the tree view. This view may make it easier to review the structure and content of the transformation document, and may consequently be preferred by users. In one contemplated embodiment, the users will be able to re-order sub-elements of any given element as desired.

FIG. 23 shows finish screen 2302. When the user moves forward to this screen, the wizard creates the transformation document 106 and preferably saves the transformation document 106 on internal information storage media. The user is provided with a transform button 2304, an edit button 2306, and a database map button 2308. These buttons operate in the same fashion as buttons 712, 714, and 716 (FIG. 7).

Thus far, the discussion has concentrated on the preferred path when an XML output document is desired. The XSL code excerpts provided herein have been based on a "for-each" design style. It has been discovered that a template-based approach may be preferred for output documents having fixed-width and delimited formats. A separate set of wizard screens has been provided for facilitating the design of the transformation documents for these output files.

Pressing the fixed length button 718 on the selection screen 902 (FIG. 9) calls up the fixed length file definition screen 2402 shown in FIG. 24. This screen includes a list 2404 of available entities, a set of required parameter entry fields 2406–2410, an add field button 2412, a list 2414 of fields, a set of shortcut buttons 2416–2420, an add linefeed button 2422, and a set of user action buttons 2424–2434. When the screen 2402 is first opened, the available entity list 2404 lists the entities selected by the user in the selection screen. 902. As the entities are redefined as fixed length fields, they are removed from the available entity list 2404 and placed in the field list 2414.

To redefine an entity as a field, the user enters a field size (i.e. the number of characters) in entry box 2406, selects a pad side using radio buttons 2408, and enters a pad character in entry box 2410. If the value of the entity has fewer characters than the field size, the value is padded by adding pad characters on the side specified by radio buttons 2408. Once the field size 2406, pad side 2408, and pad character 2410 have been specified, the user presses add field button 2412 or shortcut button 2416 to finish the field redefinition. The new field will be added to the bottom of the field list 2414. This process can be repeated to redefine each of the entities in list 2404. The shortcut key 2418 allows a user to remove a field from the field list 2414 and return it to the available entity list 2404. Shortcut key 2420 removes all of the fields from field list 2414 and places them in the available entity list 2404. These key provide an easy way to remedy errors.

Insert linefeed checkbox 2422 allows the user to specify that a linefeed should be added at the end of the file. By default, linefeeds are only inserted between rows (all of the fields taken together form one row). The order of fields in the list 2414 indicate the field order. Arrow buttons 2424, 2426 allow a user to shift a selected field higher or tower in the field order.

Pressing the transform button 2428 causes the wizard to generate the transformation document and to apply the transformation document to the input document to generate the fixed length output file. The fixed length output file is preferably shown in a separate window for the user to inspect. The view XSL button 2430 causes the wizard to generate the transformation document and display it in a separate window for the user's inspection. The user can save the transformation document from this separate window.

The wizard provides the following transformation document skeleton for fixed length files:

```
<?xml version="1.0"?>
<xsl:stylesheet xmlns:xsl="http://www.w3.org/1999/XSL/Transform"
version="1.0">
<!-- Copyright 2001. Qcorps Residential, Inc. All rights reserved -->
    <xsl:include href="fixlengen.xsl" />
    <xsl:strip-space elements="*" />
    <xsl:output method="text" encoding="utf-8" />
    GLOBAL VARIABLES DEFINED HERE
    <xsl:template match="/">
        FIELD 1 ROUTINE INVOKED HERE
        FIELD 2 ROUTINE INVOKED HERE
        . . .
        FIELD N ROUTINE INVOKED HERE
    </xsl:template>
    FIELD 1 ROUTINE DEFINED HERE
    FIELD 2 ROUTINE DEFINED HERE
    . . .
    FIELD N ROUTINE DEFINED HERE
</xsl:stylesheet>
```

The global variable definitions are discussed further below. The field routines can be to determine and show a field value in an output document, or they may simply be to evaluate an intermediate variable value. The latter option is discussed further below. Fields that are simply redefined entities from the input document are determined in routines. Assume that the name of the redefined entity is "/request/connect/resident/name". The routine for this field is invoked using the following code:

```
<xsl:apply-templates select="/request/connect/resident/name"/>
```

This same code is used for attributes redefined as fields. Attribute names are indicated using an @sign. For example:

```
<xsl:apply-templates select="/request/connect/resident/@residentID"/>
```

The field routines that are invoked must be defined. They are preferably defined using the following pattern. Assume that the name of the redefined entity is "/request/connect/resident/name", that the pad character is "#", and that the field size is 27.

```
<xsl:template match="/request/connect/resident/name">
    <xsl:call-template name="strextractor">
        <xsl:with-param name="str">
            <xsl:value-of select="."/>
        </xsl:with-param>
        <xsl:with-param name="fixlength" select="27" />
        <xsl:with-param name="padside" select="r" />
        <xsl:with-param name="padchar" select="#" />
    </xsl:call-template>
</xsl:template>
```

Figure 25:
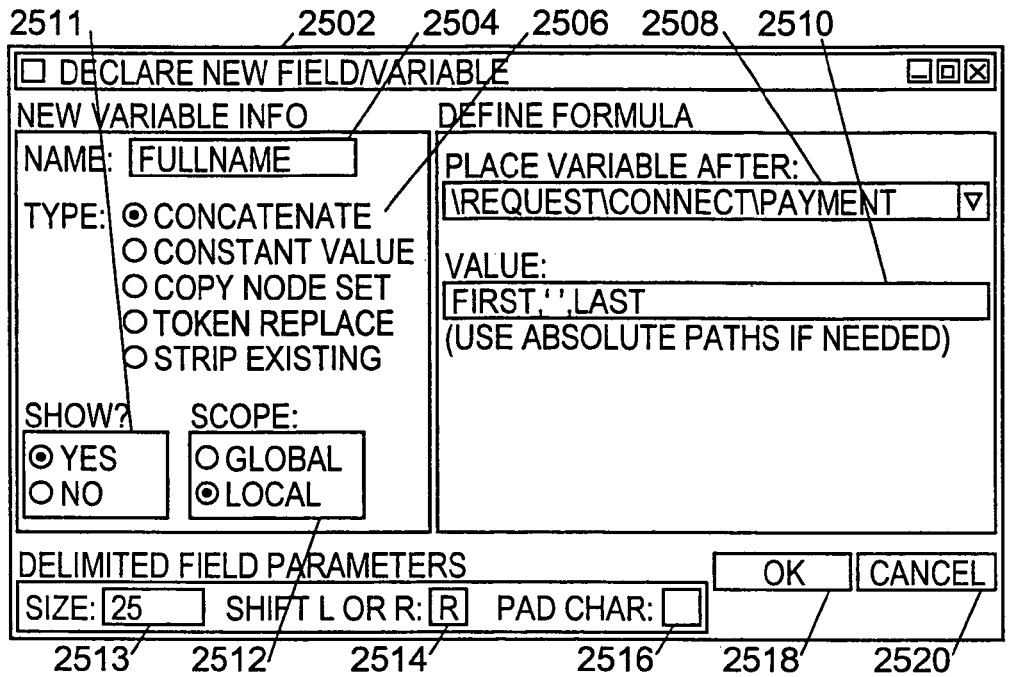
FIG. 25 is a schematic diagram of an exemplary screen for definition of a new entity based on concatenation of existing entities.
Figure 26:
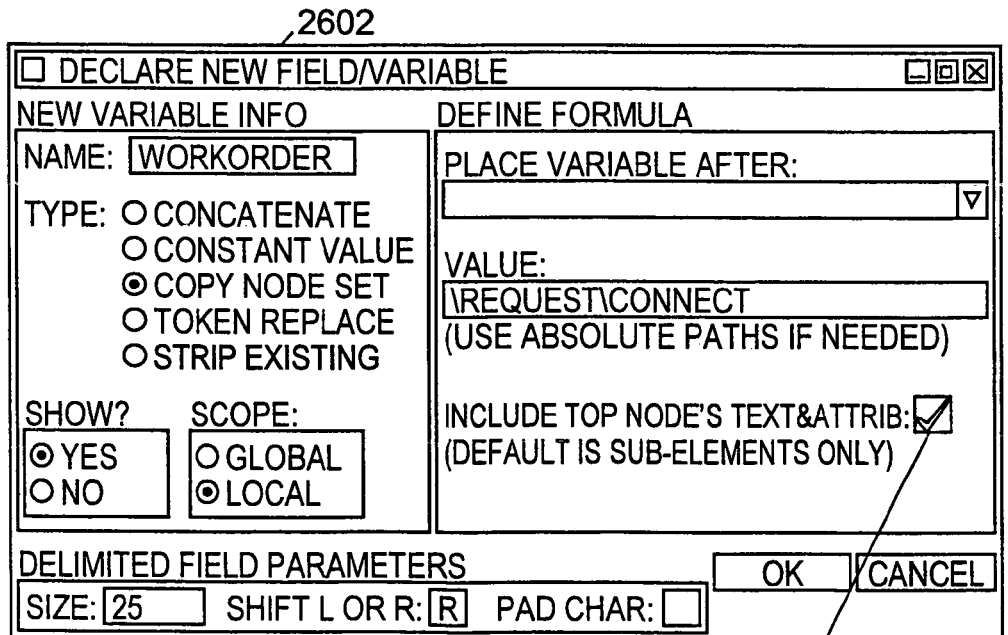
FIG. 26 is a schematic diagram of an exemplary screen for definition of a new entity based on copying a set of existing entities.
Figures 27, 28:
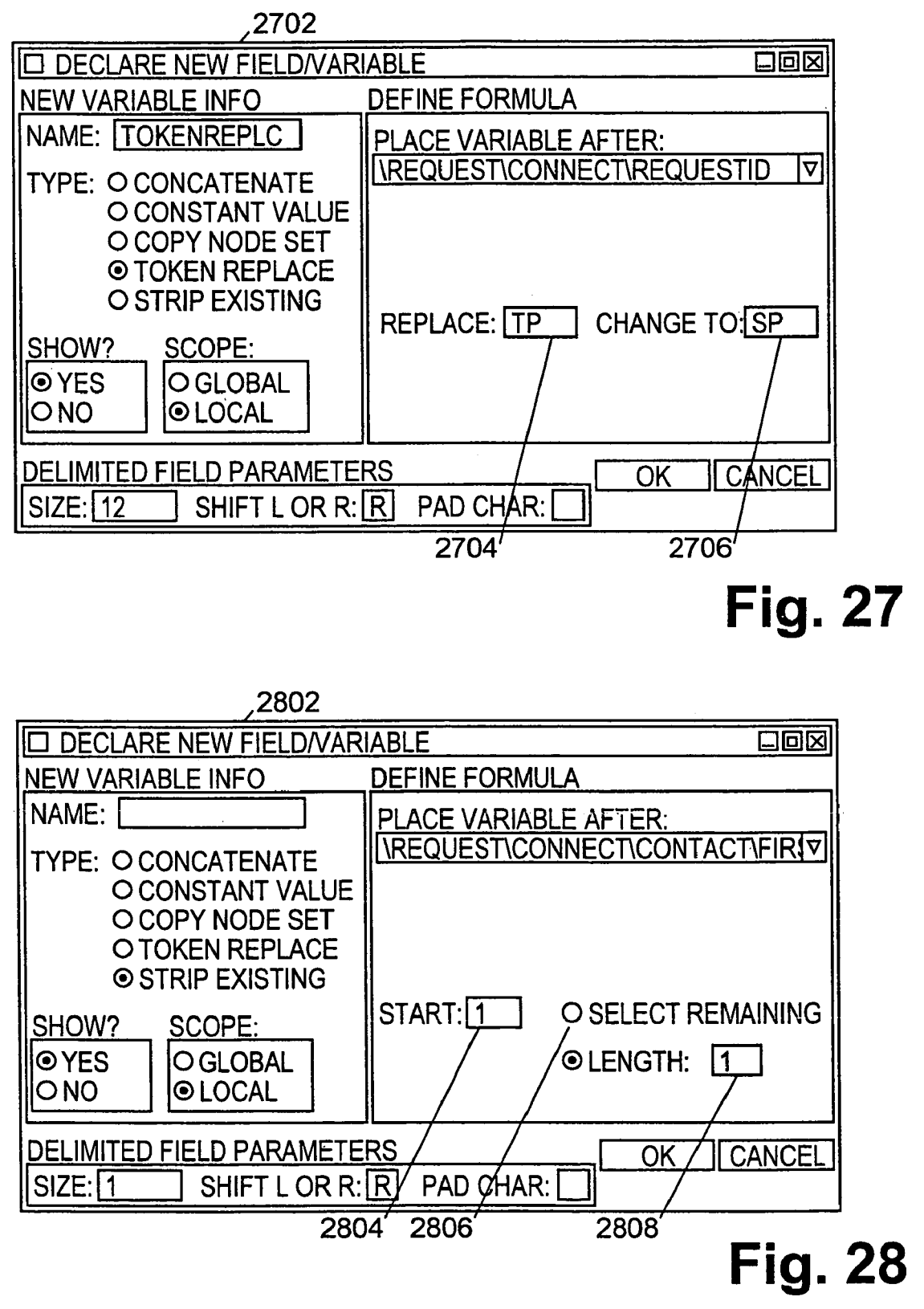

The conversion of the element to a fixed length field is handled by a library function "strextractor" that is contained in the include file "fixlenggen.xsl". An example of an include file for delimited output files (not fixed length output files) is provided in an attached appendix. New field button 2432 is used to create new fields in the field list 2414, and conditional button 2434 is used to attach conditions to whichever field is selected. The new field button 2432 causes the wizard to present new field declaration screen 2502. This screen has different variations shown in FIGS. 25–28. The variations shown each correspond to one of the action type radio buttons 2506. In FIG. 25, the Concatenate radio button is selected. The screen corresponding to the Constant Value radio button is very similar to FIG. 25 and is not shown separately. In FIG. 26, the Copy Node Set radio button is selected. In FIG. 27, the Token Replace radio button is selected, and in FIG. 28, the Strip Existing radio button is selected.

Returning to FIG. 25, the screen 2502 includes a name entry box 2504, radio buttons 2506, a location scroll box 2508, a show option 2511, a scope option 2512, field parameter entry boxes 2513–2516, OK button 2518 and Cancel button 2520. Each of these is also shown in FIGS. 26–28. Name entry box 2504 is used to specify the name of the new variable. Radio buttons 2506 are used to select the action type, and hence the corresponding screen to prompt the user for the necessary parameters. The location scroll box provides the field list 2414 from which the user can select a field. The new variable or field will be placed after the selected field.

Show option 2511 is a yes/no radio button selection. If the show option is selected, the output document will have a field that shows the value of this variable. If the show option is deselected, no corresponding field appears in the output document. This may be desired if the variable is used only for intermediate calculations and does not provide a desired output result. The scope option offers global/local scope options. Global variables can be referred to anywhere in the transformation document, whereas local variables can only be used locally.

Field parameter entry boxes are provided for the field size 2513, the justification 2514, and the pad character 2516. The OK button 2518 completes the definition of the new variable and causes it to be added to the field list 2414 as the user is returned to screen 2402. The cancel button 2520 aborts the definition of the new variable and returns the user to screen 2402.

The necessary parameter for the concatenate type of variable is a list of available entities and values in the order that they are to be concatenated. An entry box 2510 is provided for this purpose.

A global variable definition of a variable called "state" might appear as follows:

```
<xsl:variable name="state">
    <xsl:value-of select="/request/program/contactaddr/state" />
</xsl:variable>
```

The code for a new variable of the concatenate type, assuming a variable name "FullName", a formula of "first, ' ',last", a local scope, and a selected show option, would appear in the transformation document as follows:

```
<xsl:template match="FullName">
    <xsl:variable name="FullName">
        <xsl:value-of select="concat(first,' ',last)"/>
    </xsl:variable>
    <xsl:call-template name="strextractor">
        <xsl:with-param name="str">
            <xsl:value-of select="$FullName"/>
        </xsl:with-param>
        <xsl:with-param name="fixlength" select="27" />
        <xsl:with-param name="padside" select="r" />
        <xsl:with-param name="padchar" select="#" />
    </xsl:call-template>
</xsl:template>
```

If the show option had been de-selected, the "strextractor" routine call would have been omitted.

The screen for a new constant variable looks essentially identical to FIG. 25. The code for a new constant variable, assuming a variable name "Greeting", a value of "Hello", and a de-selected show option, would appear in the transformation document as follows:

```
<xsl:template match="Greeting">
    <xsl:variable name="Greeting">
        Hello
    </xsl:variable>
</xsl:template>
```

Note that the call to the "strextractor" routine has been omitted.

FIG. 26 shows the copy node screen 2602. The primary difference between this and the previous screen is an option checkbox 2604. The checkbox may be used to toggle between the default (copy only subelements of the named element) and non-default (copy value, attributes, and sub-elements of the named element). The code for a new copy-node element named "NewCopy", which is a copy of "OldCopy", using the default option, is:

```
<xsl:template match="OldCopy">
    <xsl:variable name="NewCopy">
        <xsl:copy-of select="./*"/>
    </xsl:variable>
    <xsl:call-template name="strextractor">
        <xsl:with-param name="str">
            <xsl:value-of select="$NewCopy"/>
        </xsl:with-param>
        <xsl:with-param name="fixlength" select="27" />
        <xsl:with-param name="padside" select="r" />
        <xsl:with-param name="padchar" select="#" />
    </xsl:call-template>
</xsl:template>
```

FIG. 27 shows a token replace screen 2702. Here the required values are the text to be replaced, and the text to replace it with. Entry boxes 2704, 2706 are provided for this purpose. The code for the resulting variable "TokenRplc" produced by replaced "TP" in "/request/connect/requestID" with "SP" is:

```
<xsl:template match="/request/connect/requestID">
    <xsl:variable name="TokenRplc">
        <xsl:value-of select="translate(.,'TP','SP')"/>
    </xsl:variable>
    <xsl:call-template name="strextractor">
        <xsl:with-param name="str">
            <xsl:value-of select="$TokenRplc"/>
        </xsl:with-param>
        <xsl:with-param name="fixlength" select="8" />
        <xsl:with-param name="padside" select="r" />
        <xsl:with-param name="padchar" select=" " />
    </xsl:call-template>
</xsl:template>
```

FIG. 28 shows a strip-existing screen 2802. It provides a text entry box 2804 for the starting position of the desired substring, and two radio button options 2806. The first option is to simply "select remaining", i.e. strip only those characters to the left of the specified starting position. The second option is to specify a substring length. A text entry box 2808 is provided for specifying the number of characters in the desired substring. The code for the new strip-existing variable "FirstInitial" obtained by taking one character from the beginning of "/request/connect/contact/first" is:

```
<xsl:template match="/request/connect/contact/first">
    <xsl:call-template name="strextractor">
        <xsl:with-param name="str">
            <xsl:value-of select="$FirstInitial"/>
        </xsl:with-param>
        <xsl:with-param name="fixlength" select="1" />
        <xsl:with-param name="padside" select="r" />
        <xsl:with-param name="padchar" select="_" />
    </xsl:call-template>
</xsl:template>
```

Note that the variable declaration for FirstInitial to is absent. This is due to selecting the Global scope option. The variable declaration is:

```
<xsl:variable name="FirstInitial">
    <xsl:value-of select="substring(/request/connect/contact/first,1,1)"/>
</xsl:variable>
```

Referring momentarily back to FIG. 24, the conditional button 2434 opens screen 2902 (FIG. 29), which allows a user to attach a condition to a field. Screen 2902 shows the name of the selected field 2904, a scroll box 2906 for tests, and an entry box 2908 for specifying test values or test entities. Scroll box 2906 preferably presents the tests for =, <, >, ≧, ≦, and !=. Entry box 2908 preferably allows the user to select from the original list of available entities, or to type in a test value. A text entry box 2910 is also provided for specifying the result if the test condition evaluates to true. The user may enter a result or select from a list of pre-programmed options such as "Return current node value" and "Return parent node value". An option checkbox 2912 is provided for calling the template inside the conditional code, or (by default) placing the conditional code inside the template. Placing the template inside the conditional code may prevent the template from being executed at all, and hence may result in the omission of a field.

The conditional logic structure for fixed-length files is the when-type structure. Accordingly, the user may add additional tests by pressing the plus button 2916, and may specify in entry box 2914 an action to take if none of the test conditions evaluate to true (the "otherwise" action"). The user may type the desired action in box 2914, or may select from a list of pre-programmed options such as "fill field with pad character". A list of the test conditions entered so far is provided in list 2918, and the number of conditions 2920 is provided. The field size and pad character are provided at 2926. When finished, the user presses the OK button 2922. If the user wishes to leave this screen without finishing, the cancel button 2924 is used. Two examples of the conditional code are provided below. The first has the conditions inside the template call.

```
<xsl:template match="/request/connect/resident/residentInfo/@id">
    <xsl:call-template name="strextractor">
        <xsl:with-param name="str">
            <xsl:choose>
                <xsl:when test="normalize-space(.)='hphone'">
                    <xsl:value-of select="."/>
                </xsl:when>
                <xsl:when test="normalize-space(.)='ssn'">
                    <xsl:value-of select="../."/>
                </xsl:when>
                <xsl:otherwise>
                    <xsl:value-of select="."/>
                </xsl:otherwise>
            </xsl:choose>
        </xsl:with-param>
        <xsl:with-param name="fixlength" select="'20'" />
        <xsl:with-param name="padside" select="'1'" />
        <xsl:with-param name="delimiter" select="','" />
    </xsl:call-template>
</xsl:template>
```

And now, outside the template call:

```
<xsl:template match="/request/connect/resident/residentInfo/@id">
    <xsl:choose>
        <xsl:when test="normalize-space(.)='hphone'">
```

-continued

```
<xsl:call-template name="strextractor">
    <xsl:with-param name="str">
        <xsl:value-of select="."/>
    </xsl:with-param>
    <xsl:with-param name="fixlength" select="'20'" />
    <xsl:with-param name="padside" select="'1'" />
    <xsl:with-param name="delimiter" select="','" />
</xsl:call-template>
</xsl:when>
<xsl:when test="normalize-space(.)='ssn'">
    <xsl:call-template name="strextractor">
        <xsl:with-param name="str">
            <xsl:value-of select="../."/>
        </xsl:with-param>
        <xsl:with-param name="fixlength" select="'20'" />
        <xsl:with-param name="padside" select="'1'" />
        <xsl:with-param name="delimiter" select="','" />
    </xsl:call-template>
</xsl:when>
<xsl:otherwise>
    <xsl:call-template name="strextractor">
        <xsl:with-param name="str">
            <xsl:value-of select="." />
        </xsl:with-param>
        <xsl:with-param name="fixlength" select="'20'" />
        <xsl:with-param name="padside" select="'1'" />
        <xsl:with-param name="delimiter" select="','" />
    </xsl:call-template>
</xsl:otherwise>
</xsl:choose>
</xsl:template>
```

In addition to the fixed-length format, the wizard also supports the delimited format. In the delimited format, the fields are not restricted to fixed-lengths. Rather, they can be of any length, and a delimiting character is used to separate the fields. In addition, the fields may be enclosed by pairs of any specified quote characters (e.g. single quotes, double quotes, parenthesis, brackets, etc.). The procedure that the wizard leads the user through for delimited files is nearly identical to that for the fixed length files. The required information on screen 2402 (FIG. 24) changes to entry boxes for the delimiting and quote characters. The change to the code is limited to changing the include file to "delimiter.xsl", and changing the called template from "strextractor" to "fieldvalue". The include file for this format is provided in the appendix.

The underlying data structure for the output list used by the wizard to accumulate the information for the XSL transformation document is preferably an array. In the preferred embodiment, each of the array elements includes a set of 26 fields that simplify the implementation of the wizard, while at the same time making it possible to support the creation of various new element types and the creation of conditional element. The array element fields are individually named and described below.

Unique ID. This field is a unique identifier of the element, which is reset (i.e. not preserved) when the transformation document is re-loaded. It may simply be the ordinal number of the element in the array.

Element/Attribute Name. This field is a string value that stores the name of this element in XML format.

Variable Name. If this element is a new element, this field is a string value that stores the name of the element. Otherwise, it defaults to the empty (null) string.

Alias. This field is a string value that stores any alias for the original name of the element in the input document. Aliasing is used to handle keyword tags if the input document is an XSLT document. When creating a transformation document, the wizard will insert an alias definition and substitute the alias for the original name. This defaults to the empty (null) string.

Full Path. This field is a string value that stores the full path of the element in XPath form. Note that this path information is defined by the input document structure, not the transformation document structure. The path includes the original name of the element. If this is a new element, this field defaults to the empty (null) string.

Levels. This field represents the nesting level (i.e. the number of layers in the full path) of the element. This value for the root element is 1. For sub-elements of the root element, this value is 2. For sub-sub-elements, this value is 3, and so on.

Node Key. This field stores the unique number of the element in the tree view (see FIG. 22). This number corresponds to order in which nodes in the tree are traversed in a depth-first traversal. See p. 83–86 of K. Y. Fung, XSLT, Addison-Wesley:Boston, © 2001 (hereby incorporated herein by reference), for a detailed description of depth-first traversal to enumerate nodes of a tree.

Node Tag. This field is a string value that stores the tag (i.e. the name of the element and the attributes) as shown in the tree view (see FIG. 22).

Parent's Unique ID. This field stores the "Unique ID" identifier value of the parent for this element.

Parent. This field is a string value that stores the name of the parent element for this element.

Parent Key. This field stores the unique tree-view number of the parent for this element.

Number of Children. This field stores the number of sub-elements of this element.

Children. This field is a string value that stores a pipe-delimited (the pipe character "|" separates the values) of Unique ID values for the sub-elements of this element.

Children XSL. This is a string value that stores the sub-elements of this element as a complete XSL fragment.

Loop. This field tracks the nesting level of the "xsl:for-each" loop elements.

Sort Order. This field stores the sorted order of the entity list.

Calculation Type. This field stores the selected new element type (1=constant, 2=concatenation, 3=strip, 4=replace, 5=copy whole).

Conditional Type. This field stores the selected condition type (1=if, 2—choose).

Conditional Logic. This field stores the conditional expression to be evaluated.

Conditional XSL. This field stores the condition in complete XSL form.

Process Flag. This field is used by the wizard when generating the transformation document code to indicate whether this element has been processed or not.

Size of Column. This field is used to specify the size of an element having a fixed output width.

Justification. This field is used to specify whether the value for a fixed-size element should be padded on the left or right side.

Pad Character. This field is used to specify the character used to pad the values of fixed-size elements. This defaults to the space character " ".

Quote Character. This field is used to specify whether the single quote character or the double quote character should be used for delimited-output elements having string values.

Delimiter. This field is used to specify the delimiter character used to separate the values of delimited-output elements.

Output elements that the user selects to be conditional elements will be assigned a conditional type, and the condition formula provided by the user will be stored in the Conditional Logic field of the element. When the wizard later creates a XSL code for the transformation document, the condition code is stored in the Conditional XSL field, and translated in the fashion described after the description of FIG. 17.

Note that the screens described above are representative only, and are not limiting in any fashion. Variations in style, structure, and content, may be employed without departing from the spirit of the invention. The invention contemplates various color schemes, layouts, and procedure variations.

It is further noted that the contemplated embodiment includes a sub-wizard for converting fixed-length input files and delimited input files into XML input documents. The user can then author a transformation document that can be applied to other similarly converted input documents.

The wizard offers numerous advantages relative to manual authoring of a transformation document. One advantage is code standardization. Although there are many ways to accomplish a given task in XSLT, the manner in which the wizard translates elements into XSL transform code is predetermined, and will not vary from document to document. The wizard may use a standardized library of transcription fragments, so that the method a particular element is translated is written in modular form and can be modified with ease. The library can be designed to ensure compliance with a wide range of XSLT engines, so that the transformation documents need not be modified when a different XSLT engine is used. Another substantial advantage is that many typographical and syntax errors are completely eliminated. Most of the transcription document is constructed from automatic transcription fragments, and only a small portion is constructed from manually entered text. Further, because the manually entered text is entered one piece at a time, the user is able to concentrate on each piece in isolation, and is more able to identify and avoid potential errors.

Numerous variations and modifications will become apparent to those skilled in the art once the above disclosure is fully appreciated. For example, the wizard may be adapted to generate Xpointer documents instead of (or in addition to) XSL transformation documents. It is intended that the following claims be interpreted to embrace all such variations and modifications.

APPENDIX

An illustrative include file, "delimiter.xsl", is provided below. This is the include file that the generated transform file requests when the output file is in a delimited format.

```
<?xml version="1.0" encoding="UTF-8"?>
<!--
    Copyright 2001 Qcorps Residential.
    This style sheet was designed for Qcorps for delimited output.
    For example:
    <p>
    <pre>
        <xsl:call-template name="fieldvalue">
            <xsl:with-param name="strin" select="name/first"/>
            <xsl:with-param name="delimiter" select="','"/>
            <xsl:with-param name="quote" select="'dq'"/>
        </xsl:call-template>
    </pre>
    </p>
    @author: Maulik Modi
    @version %I%, %G%
    @see    #fieldvalue( )
-->
<xsl:stylesheet version="1.0" xmlns:xsl="http://www.w3.org/1999/XSL/Transform">
<xsl:strip-space elements="*" />
<xsl:output method="text" />
```

<!—This template takes an XML source and converts the field values to delimited output based on the #delimiter passed in by the user. By default, the delimiter is set to comma.

@param strin: An incoming string to be operated upon.

@param delimiter—An UTF-8 character code which is the delimiter used between each field, the default is a space.

@param quote: A quote character to be placed before and after the field values. The options are 'dq' or 'sq' for double quotes or single quotes. The default is nothing.

@return—Returned is a list of fieldnames separated by the #delimiter.

```
-=>
    <xsl:template name="fieldvalue">
    <xsl:param name="strin" />
    <xsl:param   name="delimiter"><xsl:text   disable-output-
escaping="yes">,</xsl:text></xsl:param>
    <xsl:param name="quote"/>
    <xsl:variable name="intquote">
    <xsl:choose>
        <xsl:when test="$quote='dq'">
            <xsl:text disable-output-escaping="yes">"</xsl:text>
        </xsl:when>
        <xsl:when test="$quote='sq'">
            <xsl:text disable-output-escaping="yes">'</xsl:text>
        </xsl:when>
        <xsl:otherwise></xsl:otherwise>
    </xsl:choose>
    </xsl:variable>
    <xsl:value-of select="concat($intquote,normalize-space($strin),$intquote,$delimiter)"/>
    </xsl:template>
<!-- Disable any output matching elements or attributes or text nodes. -->
<xsl:template match="*|text( )|@*" />
</xsl:stylesheet>
```

What is claimed is:

1. A computer configured to create a transformation document in response to user input, the computer comprising:

a user output device;

a processor; and a memory that includes a software application which configures the processor to display a series of screens on the user output device to gather input from the user, and further configures the processor to create a transformation document in response to said input, wherein the series of screens includes:

a load screen that prompts the user for an input document name; and a select screen that shows entities of the input document in tree form and allows the user to select input document entities for inclusion in the transformation document;

wherein the software application constructs the transformation document according to the following pattern:

```
<?xml version="1.0"?>
<xsl:stylesheet PREDETERMINED ATTRIBUTES PROVIDED HERE>
    <xsl:include href="IncludeFile.xsl" />
    <xsl:strip-space elements="*" />
    <xsl:output method="text" encoding="utf-8" />
    GLOBAL VARIABLES (IF ANY) DEFINED HERE
    =xsl:template match="/">
        <xsl:apply-templates select="TemplateName1"/>
        <xsl:apply-templates select="TemplateName2"/>
        ...
        <xsl:apply-templates select="TemplateNameN"/>
    /xsl:template>
    <xsl:template match="TemplateName1">
        ENTITY 1 ACTION DEFINED HERE
    </xsl:template>
    <xsl:template match="TemplateName2">
        ENTITY 2 ACTION DEFINED HERE
    </xsl:template>
    ...
    <xsl:template match="TemplateNameN">
        ENTITY N ACTION DEFINED HERE
    </xsl:template>
</xsl:stylesheet>
``` wherein "IncludeFile.xsl" is a filename for a library of standardized routines, and wherein "TemplateNamex" is a name for a template that specifies an action for a corresponding entity, wherein the software application allows the user to specify an output document format, and wherein the transformation document, when applied to an input document, configures a transformation engine to generate an output document having the specified output document format, wherein the specified output document format is fixed-length, and wherein the software application constructs non-conditional entity templates according to the following pattern:

```
<xsl:template match="TemplateNamex">
    LOCAL VARIABLE (IF ANY) DEFINED HERE
    <xsl:call-template name="strextractor">
        <xsl:with-param name="str">
            <xsl:value-of select="VariableNamex"/>
        </xsl:with-param>
        <xsl:with-param name="fixlength" select="Length" />
        <xsl:with-param name="padside" select="Side" />
        <xsl:with-param name="padchar" select="Char" />
    </xsl:call-template>
<xsl:template>
``` wherein "strextractor" is a name of a library routine that produces a fixed length field, wherein "VariableNamex" is a name of a variable that stores a value for the fixed length field, "Length" is a field size, "Side" is an indicator of which side of the value to add pad characters on, and "Char" is a character to use for padding the value.

2. The computer of claim 1, wherein the software application constructs conditional entity templates according to the following pattern:

```
=xsl:template match="TemplateNamex">
    <xsl:call-template name="strextractor">
        <xsl:with-param name="str">
            <xsl:choose>
```

-continued

```
    <xsl:when test="Test1">
        RESULT 1 DEFINED HERE
    </xsl:when>
    <xsl:when test="Test2">
        RESULT 2 DEFINED HERE
    </xsl:when>
    <xsl:otherwise>
        OTHERWISE RESULT (IF ANY) DEFINED HERE
    </xsl:otherwise>
  </xsl:choose>
</xsl:with-param>
```

-continued

```
        <xsl:with-param name="fixlength" select="Length" />
        <xsl:with-param name="padside" select="Side" />
        <xsl:with-param name="padchar" select="Char" />
    </xsl:call-template>
</xsl:template>
``` wherein "Testx" is a user specified test.

* * * * *